(12) United States Patent
Abraham et al.

(10) Patent No.: US 7,554,487 B2
(45) Date of Patent: Jun. 30, 2009

(54) METHOD AND SYSTEM FOR DETERMINING TIME IN A SATELLITE POSITIONING SYSTEM

(75) Inventors: Charles Abraham, Los Gatos, CA (US); Sergi Podshivalov, San Jose, CA (US); Frank van Diggelen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/728,391

(22) Filed: Mar. 26, 2007

(65) Prior Publication Data

US 2007/0171125 A1 Jul. 26, 2007

Related U.S. Application Data

(63) Continuation of application No. 10/265,090, filed on Oct. 4, 2002, now Pat. No. 7,196,660, which is a continuation-in-part of application No. 10/190,745, filed on Jul. 8, 2002, now Pat. No. 6,734,821, and a continuation-in-part of application No. 09/715,860, filed on Nov. 17, 2000, now Pat. No. 6,417,801.

(51) Int. Cl.
*G01S 5/14* (2006.01)

(52) U.S. Cl. .............................. 342/357.02; 342/357.09

(58) Field of Classification Search ........................ None
See application file for complete search history.

(56) References Cited

U.S. PATENT DOCUMENTS

| | | | |
|---|---|---|---|
| 4,894,662 A | 1/1990 | Counselman | |
| 5,225,842 A | 7/1993 | Brown et al. | |
| 5,365,450 A | 11/1994 | Schuchman et al. | |
| 5,420,592 A | 5/1995 | Johnson | |
| 5,426,665 A | 6/1995 | Cleverly et al. | |
| 5,459,473 A | 10/1995 | Dempster et al. | |
| 5,727,018 A | 3/1998 | Wolf et al. | |
| 5,736,960 A | 4/1998 | Murphy et al. | |
| 5,757,916 A * | 5/1998 | MacDoran et al. | .......... 380/258 |
| 5,760,737 A | 6/1998 | Brenner | |

(Continued)

FOREIGN PATENT DOCUMENTS

EP  1167993 A2  1/2002

(Continued)

OTHER PUBLICATIONS

Mills, David L. "Adaptive Hybrid Clock Discipline Algorithm for the Network Time Protocol," IEEE/ACM Transactions on Networking, vol. 6, No. 5 Oct. 1998, pp. 505-514.*

(Continued)

*Primary Examiner*—Gregory C Issing
(74) *Attorney, Agent, or Firm*—McAndrews, Held & Malloy, Ltd.

(57) ABSTRACT

Method and apparatus for receiving an estimate of time in a satellite signal receiver receives an estimate of time from a server and compensates for error of a clock in the satellite signal receiver using the estimate of time. The output of the compensated clock is used when computing a position of the satellite signal receiver. The estimate of time is received using a network time protocol (NTP), a simple network time protocol (SNTP), or by one-way broadcast from the server.

13 Claims, 13 Drawing Sheets

U.S. PATENT DOCUMENTS

| | | | |
|---|---|---|---|
| 5,841,396 | A | 11/1998 | Krasner |
| 5,874,914 | A | 2/1999 | Krasner |
| 5,877,723 | A | 3/1999 | Fan |
| 5,893,044 | A | 4/1999 | King et al. |
| 5,896,304 | A | 4/1999 | Tiemann et al. |
| 5,945,944 | A | 8/1999 | Krasner |
| 5,945,948 | A | 8/1999 | Buford et al. |
| 6,028,537 | A | 2/2000 | Suman et al. |
| 6,052,081 | A | 4/2000 | Krasner |
| 6,064,336 | A | 5/2000 | Krasner |
| 6,067,045 | A | 5/2000 | Castelloe et al. |
| 6,084,544 | A | 7/2000 | Camp, Jr. |
| 6,133,874 | A * | 10/2000 | Krasner .................. 342/357.15 |
| 6,150,980 | A | 11/2000 | Krasner |
| 6,215,442 | B1 | 4/2001 | Sheynblat et al. |
| 6,222,483 | B1 | 4/2001 | Twitchell et al. |
| 6,266,533 | B1 | 7/2001 | Zadeh et al. |
| 6,405,132 | B1 | 6/2002 | Breed et al. |
| 6,417,801 | B1 | 7/2002 | van Diggelen |
| 6,429,812 | B1 | 8/2002 | Hoffberg |
| 6,433,739 | B1 | 8/2002 | Soliman |
| 6,438,702 | B1 | 8/2002 | Hodge |
| 6,473,030 | B1 * | 10/2002 | McBurney et al. ..... 342/357.03 |
| 6,487,499 | B1 | 11/2002 | Fuchs et al. |
| 6,529,159 | B1 * | 3/2003 | Fan et al. ............... 342/357.09 |
| 6,542,820 | B2 | 4/2003 | LaMance et al. |
| 6,560,534 | B2 | 5/2003 | Abraham et al. |
| 6,573,799 | B1 | 6/2003 | Akopian |
| 6,618,670 | B1 | 9/2003 | Chansarkar |
| 6,829,535 | B2 | 12/2004 | van Diggelen et al. |
| 6,856,282 | B2 * | 2/2005 | Mauro et al. ........... 342/357.15 |
| 6,941,109 | B2 * | 9/2005 | Matsushita et al. ......... 455/13.2 |
| 2002/0005802 | A1 | 1/2002 | Bryant et al. |
| 2002/0190898 | A1 | 12/2002 | Abraham et al. |
| 2003/0023379 | A1 | 1/2003 | Diggelen et al. |
| 2004/0119639 | A1 * | 6/2004 | Gilkes ................... 342/357.15 |

FOREIGN PATENT DOCUMENTS

| | | |
|---|---|---|
| WO | WO 99/53338 | 10/1999 |
| WO | WO-99/53338 | 10/1999 |
| WO | WO 00/10028 | 2/2000 |
| WO | WO-00/10028 | 2/2000 |
| WO | WO-00/58750 | 10/2000 |
| WO | WO 00/58750 | 10/2000 |
| WO | WO-01/39698 A1 | 6/2001 |
| WO | WO 01/73467 | 10/2001 |
| WO | WO-01/73467 A2 | 10/2001 |
| WO | WO 03/010912 | 2/2003 |

OTHER PUBLICATIONS

Mills, David L., "Adaptive Hybrid Clock Discipline Algorithm for the Network Time Protocol," IEEE/ACM Transactions on Networking, vol. 6, No. 5, Oct. 1998, pp. 505-514.

International Search Report dated Feb. 20, 2004 for corresponding PCT application, PCT/US03/31222.

Supplementary European Search Report received from our European Foreign associate, A. A. Thornton & Co., on Oct. 1, 2004, from corresponding EPO Application 01997046.6.

Chansarkar, M., "Application for Patent—Resolving Time Ambiguity in GPS Using Over-Determined Navigation Solution," U.S. Appl. No. 60/232,738, filed Sep. 15, 2000.

Syrjarinne, J., "Time Recovery Through Fusion of Inaccurate Network Timing Assistance with GPS Measurements," Proceedings of the Third International Conference on Fusion, vol. 2, pp. WeD5-3-WeD5-10, Jul. 10-13, 2000.

Yiu, K., et al. "A Low-Cost GPS Receiver for Land Navigation," Global Positioning System, Hewlett-Packard Laboratories, Palo Alto, CA, pp. 44-60, May 1982.

TIA/EIA Interim Standard, Position Determination Service Standard for Dual Mode Spread Spectrum Systems, TIA/EIA/IS-801, Nov. 1999.

Expert Report of Stephen Heppe Regarding Invalidity of U.S. patent Nos. 6,417,801, 6,606,346, 6,651,000, 6,704,651, 6,937,187, and 7,158,080, Feb. 25, 2008.

First Supplemental Report of Dr. Stephen Heppe Regarding Invalidity of U.S. Patent Nos. 6,417,801, 6,606,346, 6,937,187, and 7,158,080, Apr. 4, 2008.

Respondent SiRF Technology, Inc.'s First Supplemental Objections and Responses to Global Locate, Inc.'s First Set of Interrogatories (Nos. 22, 23 and 49) and Exhibits 1-5 and 19-22, Aug. 24, 2007.

Respondent SiRF Technology, Inc.'s Sixth Supplemental Objections and Responses To Global Locate, Inc.'s First Set of Interrogatories (Nos. 19, 21-23, and 27-28), Apr. 3, 2008.

Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 1-5 and 19-22, Aug. 31, 2007.

Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.

Melbourne, W.G., et al. "Scientific Applications of GPS on Low Earth Orbiters," Jet Propulsion Laboratory, California Institute of Technology, http://hdl.handle.net/2014/32419, 1994.

Young, L., et al. "GPS Precision Orbit Determination: Measured Receiver Performance," Jet Propulsion Laboratory, California Institute of Technology, http://hdl.handle.net/2014/35887, 1993.

Chansarkar, M., et al. "Acquisition of GPS Signals at Very Low Signal to Noise Ratio," ION NTM 2000, Anaheim, CA, pp. 731-737, Jan. 26-28, 2000.

Lamance, J., et al. "Assisted GPS—Low Infrastructure Approach," GPS World, vol. 13, No. 3, pp. 46-51, Mar. 2002.

Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.

Aparicio., M., et al. "GPS Satellite and Payload," Global Positioning System: Theory and Applications vol. I, Progress in Astronautics and Aeronautics, vol. 163, Ch. 6, pp. 209-244, 1996.

File History—U.S. Appl. No. 10/081,164, Feb. 22, 2002.

Lannelongue, Stephane, et al., "Fast Acquisition Techniques for G.P. S. Receivers," TTC and Navigation Section, European Space Agency (ESA/ESTEC), ION-GPS-98, Session 2B, Land Navigation, Denver, CO, pp. 261-269, Jun. 1-3, 1998.

Milliken, R. J., et al., "Principle of Operation of NAVSTAR and System Characteristics," Navigation: Journal of the Institute of Navigation, vol. 25, No. 2, pp. 95-106, Summer 1978.

Noe, P. S., et al., "A Navigation Algorithm for the Low-Cost GPS Receiver," Navigation: Journal of the Institute of Navigation, vol. 25, No. 2, pp. 258-264, Summer 1978.

Peterson, Capt. Benjamin, et al., "GPS Receiver Structures for the Urban Canyon," U.S. Coast Guard Academy, ION-GPS-95, Session C4, Land Vehicular Applications, Palm Springs, CA, pp. 1323-1332, Sep. 12-15, 1995.

Wu, S.C., et al., "MicroGPS for Low-Cost Orbit Determination," TDA Progress Report 42-131, pp. 1-12, Nov. 15, 1997.

Initial Determination, Certain GPS Devices and Products Containing Same, United States International Trade Commission Investigation No. 337-TA-602, Public Version, Nov. 25, 2008.

Rebuttal Expert Report of Anthony R. Pratt, Ph.D. Regarding U.S. Patent Nos. 6,704,651, 6,417,801 and 6,937,187, Rebuttal vol. II: The '801 And '187 Patents, Redacted—Non-Confidential Version, Mar. 10, 2008.

Respondents' Notice of Prior Art, Certain GPS Devices and Products Containing Same, United States International Trade Commission Investigation No. 337-TA-602, Feb. 15, 2008.

Respondents' First Supplemental Corrected Notice of Prior Art, Certain GPS Devices and Products Containing Same, United States International Trade Commission Investigation No. 337-TA-602, Mar. 4, 2008.

Complainants' Notice of Prior Art Pursuant to Ground Rule 5, Certain GPS Devices and Products Containing Same, United States International Trade Commission Investigation No. 337-TA-602, Feb. 15, 2008.

Commission Investigative Staff's Notice of Prior Art, Certain GPS Devices and Products Containing Same, United States International Trade Commission Investigation No. 337-TA-602, Feb. 15, 2008.

Lin, X. et al. "Enhanced Accuracy GPS Navigation Using the Interacting Multiple Model Estimator," IEEEx-plore, IEEE, pp. 4-1911 through 4-1923, 2001.

Knight, D. T. "Rapid Development of Tightly-Coupled GPS/INS Systems," IEEE AES Systems Magazine, Feb. 1997, pp. 14-18, Feb. 1997.

Kao, M. H., et al. "Multiconfiguration Kalman Filter Design for High-Performance GPS Navigation," IEEE Transactions on Automatic Control, vol. AC-28, No. 3, Mar. 1983, pp. 304-314.

Supplementaary European Search Report received from our European Foreign associate, A.A. Thornton & Co. on Oct. 1, 2004, from corresponding EP Application 01997046.6.

International Search Report dated Feb. 20, 2004 for corresponding PCT application, PCT/US03/31222.

* cited by examiner

METHOD AND SYSTEM FOR DETERMINING TIME IN A SATELLITE POSITIONING SYSTEM

CROSS-REFERENCE TO RELATED APPLICATIONS

This application is a continuation of co-pending U.S. patent application Ser. No. 10/265,090, filed Oct. 4, 2002, which is a continuation-in-part of co-pending U.S. Pat. No. 6,734,821, issued May 11, 2004, which is a continuation-in-part of U.S. Pat. No. 6,417,801, issued Jul. 9, 2002, each of which are herein incorporated by reference in their entireties.

BACKGROUND OF THE INVENTION

The invention generally relates to satellite-based position location and, more particularly, the invention relates to a method and system for determining time in a satellite positioning system.

Description of the Related Art

Global Positioning System (GPS) receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. The GPS satellites transmit to the receivers satellite-positioning data, so called "ephemeris" data. In addition to the ephemeris data, the satellites transmit to the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

More specifically, GPS receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very little interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels, the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. By resolving the integer number of milliseconds associated with each delay to each satellite, then one has true, unambiguous, pseudoranges. The process of resolving the unambiguous pseudoranges is known as "integer millisecond ambiguity resolution".

A set of four pseudoranges together with the knowledge of the absolute times of transmissions of the GPS signals and satellite positions at those absolute times is sufficient to solve for the position of the GPS receiver. The absolute times of transmission are needed in order to determine the positions of the satellites at the times of transmission and hence to determine the position of the GPS receiver. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 millisecond accuracy or better.

Note that absolute timing errors also introduce errors as a result of the GPS satellite clock drift, but these are so much smaller than the satellite position error that they can be ignored for the purposes of this explanation (GPS clocks drift typically less than 0.1 nanoseconds per second, and the observed range to the satellite is affected by the GPS clock drift multiplied by the speed of light, this error is less than 0.03 m/s, about 25 thousand times smaller than errors caused by changes in satellite position).

There is another time parameter closely associated with GPS positioning, this is the sub-millisecond offset in the time reference used to measure the sub-millisecond pseudorange. This offset affects all the measurements equally, and for this reason it is known as the "common mode error".

The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. However, a common mode error of 1 microsecond causes a pseudorange error of 1 microsecond multiplied by the speed of light, that is 300 meters. Common mode errors have such a large effect on pseudoranges, and it is practically very difficult to calibrate the common mode error. As such, traditional GPS receivers treat the common mode error as an unknown that must be solved for, along with position, once sufficiently many pseudoranges have been measured at a particular receiver.

The process of searching for and acquiring GPS signals, and reading the ephemeris and related data, including absolute time, for a multiplicity of satellites is time consuming and introduces unacceptable delays in computing the receiver position. In addition, in many situations, there may be blockage of the satellite signals. In these cases the received signal level can be too low to demodulate and derive the satellite data without error. However, in these degraded signal situations, the receiver is capable of tracking the satellite signals, and measuring time delays (and hence distance), if an external source of ephemeris and absolute time is available.

Several innovations have been made to provide "assisted" GPS that consists of external sources of ephemeris (or equivalent) data and absolute time information. Aiding information is transmitted to the GPS receiver using some alternative form of communication (usually wireless, such as cellular data channels). Thanks to the use of assisted GPS, GPS receivers can operate in areas where signal levels are too low for traditional GPS to function properly.

Presently, most Assisted GPS requires accurate external knowledge of the absolute time from a cellular network in order to accurately determine the satellite positions. The absolute time is required to an accuracy of between 1 millisecond and 10 milliseconds, and in wireless systems is often derived from the framing boundaries of the wireless signal. Unfortunately, there are desired implementations of GPS Aiding where absolute time cannot easily be obtained from a wireless network to this accuracy at the GPS receiver. For example: the AMPS cellular phone system does not support time information; nor (currently) does the North American TDMA cellular phone system. The GSM cellular phone system supports timing information, but only through the addition of network elements known as location measurement units (LMUs). LMUs monitor the timing offsets of all the base stations relative to each other and GPS and send the value of the offsets to the GPS receiver so that the GPS receiver can use the framing boundaries of the GSM signal to derive absolute time. However, LMUs are deployed in only a subset of GSM networks. In GSM networks without LMUs, and in other situations where the cellular network cannot provide absolute time, it is desirable to provide a method for computing GPS receiver position without having accurate external knowledge of the absolute time derived from wireless network signals.

Therefore, a need exists in the art for a method and system for determining time in a satellite positioning system without having access to absolute time information from the satellites or to an external source of absolute time derived from wireless network signals.

SUMMARY OF THE INVENTION

The present invention is a method and system for receiving an estimate of time in a satellite signal receiver. The present invention receives an estimate of time from a server and compensates for error of a clock in the satellite signal receiver using the estimate of time. The output of the compensated clock is used when computing a position of the satellite signal receiver. In one embodiment, the estimate of time is received from the server using a network time protocol (NTP). In another embodiment, the estimate of time is received from the server using a simple network time protocol (SNTP). In yet another embodiment, the estimate of time is broadcasted from the server to the satellite signal receiver.

In one embodiment, the present invention uses the output of the compensated clock as an absolute time when computing position. In another embodiment, the present invention uses the output of the compensated clock as an a-priori estimate of absolute time in a mathematical model that updates the a-priori estimate of absolute time to determine a position of the satellite signal receiver and an absolute time. In yet another embodiment, the present invention uses the output of the compensated clock to check the integrity of an absolute time computed using a mathematical model that updates an a-priori estimate of absolute time. In this manner, the present invention can determine position of a satellite signal receiver without obtaining absolute time information from a satellite or an external source of absolute time derived from wireless network signals.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The invention is a method and apparatus for determining position and time in a global positioning system (GPS) without having access, at the GPS receiver, to absolute time information. In the following description, for purposes of explanation, numerous specific details are set forth in order to provide a thorough understanding of the present invention. It will be evident, however, to one skilled in the art that the present invention may be practiced without these specific details.

Figure 1:
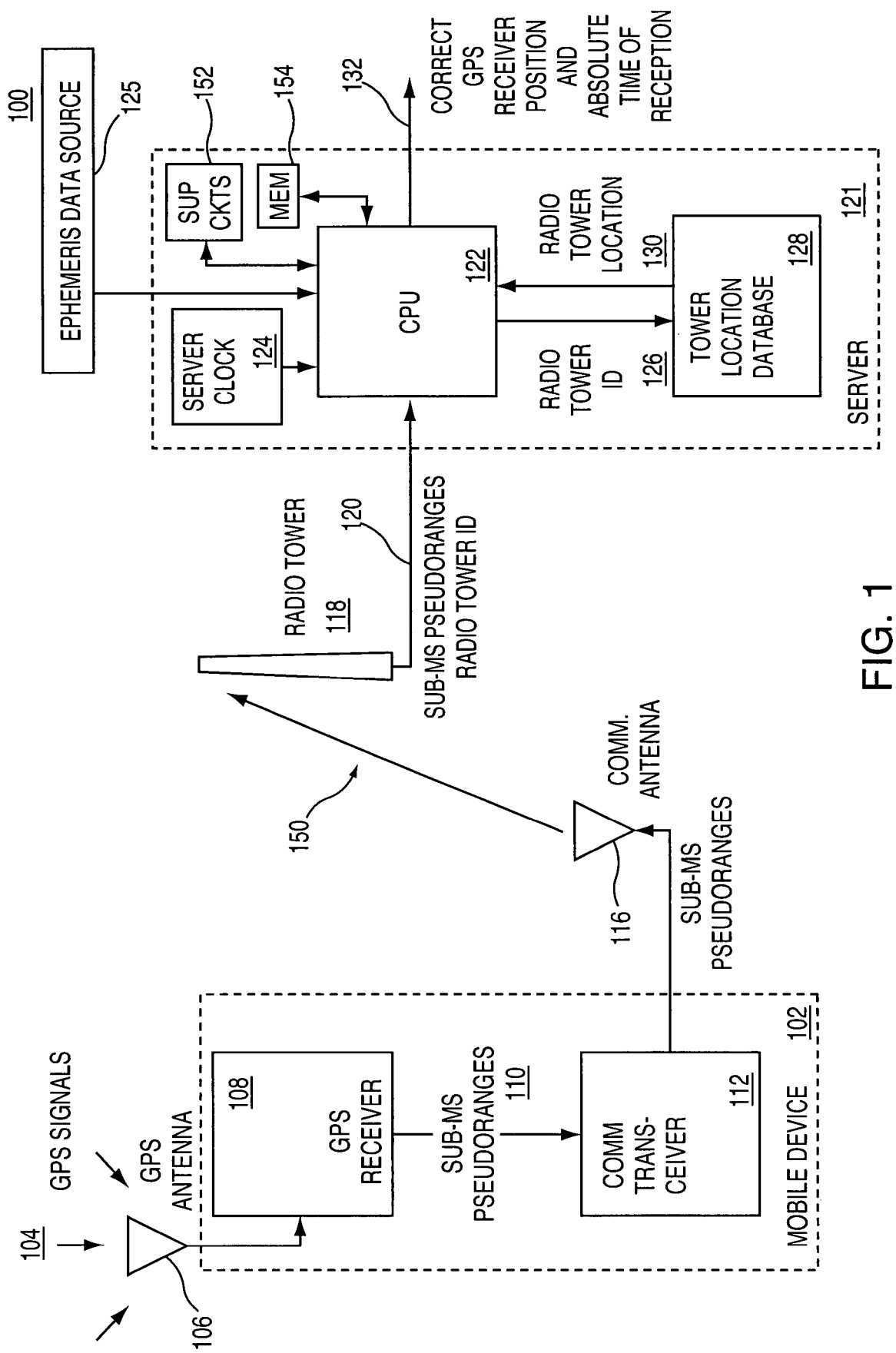
FIG. 1 depicts a block diagram of apparatus for computing a GPS receiver location without knowledge of absolute time.

FIG. 1 depicts one embodiment of the invention comprising an integrated mobile receiver 102 coupled to a server 121 via a wireless link 150. A GPS receiver 108 is contained in the integrated receiver 102 along with a wireless communication transceiver 112. The GPS receiver 108 measures only sub-millisecond pseudoranges with respect to GPS satellites that are in view of the receiver 108, and then sends these sub-millisecond pseudo-ranges to a server 121 using a wireless communication link 150. The server 121 forms an approximate, a-priori estimate of the GPS receiver position from the known location of a wireless tower 118 used to receive the wireless communication. The server 121 also allocates a time tag from its own real time clock, thus creating an a-priori estimate of the absolute time at which the GPS receiver 108 received the GPS signals from the satellites. If the a-priori position is within 100 km of the true position, and the a-priori absolute time of reception is within one minute of the true (unknown) time of reception, then the server 121 can resolve the integer milliseconds, thus turning the sub-millisecond pseudoranges into true pseudoranges.

Next, the server 121 uses the pseudoranges to solve for the unknown receiver position and absolute time. The server comprises a central processing unit (CPU) 122, a server clock 124, a tower location database 128, CPU support circuits 152, and memory 154. The support circuits comprise well-known circuits that facilitate operation of the CPU such as clock circuits, cache, power supplies, I/O interface circuits, and the like. The memory 154 may be random access memory, read only memory, removable storage, hard disk storage, or any combination of these memory devices.

In one embodiment of the invention, the common mode error is assumed to be totally unknown at the server 121. In the one embodiment of the invention, the server 121 assumes an a-priori common mode error of zero, although it will be understood that any other a-priori common mode error could be used, with no change in the results. With the five a-priori estimates of the unknown parameters (3 coordinates of position, 1 absolute time, 1 common mode error) the server 121 creates a mathematical model relating the measured pseudoranges and a-priori information to the unknown parameters. The mathematical model can be written as a linear equation, which, when solved, yields the correct position and absolute time.

More specifically, GPS signals 104 from a plurality of satellites (not shown) are received at the GPS antenna 106. The received signals are coupled to the GPS receiver 108. The GPS receiver 108 processes the GPS signals to form sub-millisecond pseudoranges on path 110, which are coupled to the communication transceiver 112 and transmitted from the communication antenna 116 through a wireless network such as a cellular telephone network. The transmission from the integrated receiver 102 is received by a nearby radio tower 118, e.g., a cellular telephone tower. The sub-millisecond pseudoranges and the radio tower ID are sent from said radio tower 118 to the server 121. In the server 121 the server clock 124 is used to provide a time-tag when the sub-millisecond pseudoranges are received at the server. The server 121 passes the radio tower ID along path 126 to a tower location database 128, and extracts a location for the tower from the database 128. The tower location is coupled to the CPU 122 along path 130.

The satellite ephemeris data, for all satellites represented by the sub-millisecond pseudorange data, is provided to the server from some external source 125 (such as another GPS receiver located in the vicinity of the server with a clear view of the sky, or some other source such as a network of GPS receivers). Note that, for simplicity, the term "ephemeris" is used to mean the satellite orbital parameters, as well as the satellite clock parameters. The CPU 122 of the server 121 combines the sub-millisecond pseudoranges, radio tower location, server time, and ephemeris to form the correct GPS receiver position and absolute time of reception of signals at the GPS receiver 108.

The apparatus above assumes that the GPS receiver 108 is not capable of reliably receiving the absolute time information and ephemeris data, i.e., the GPS receiver is used indoors, such that the processing of ephemeris data is accomplished in the server 121. However, in some instances, rather than having the pseudo range data supplied to the server, the server (or some other source) can supply the ephemeris data and clock signal to the mobile device 102 and the mobile device can perform the position calculation. In such an embodiment of the invention, a CPU and clock (similar to 122 and 124) are located in the mobile device 102 to facilitate signal processing in the same manner as is described with respect to the server 121.

Figure 2:
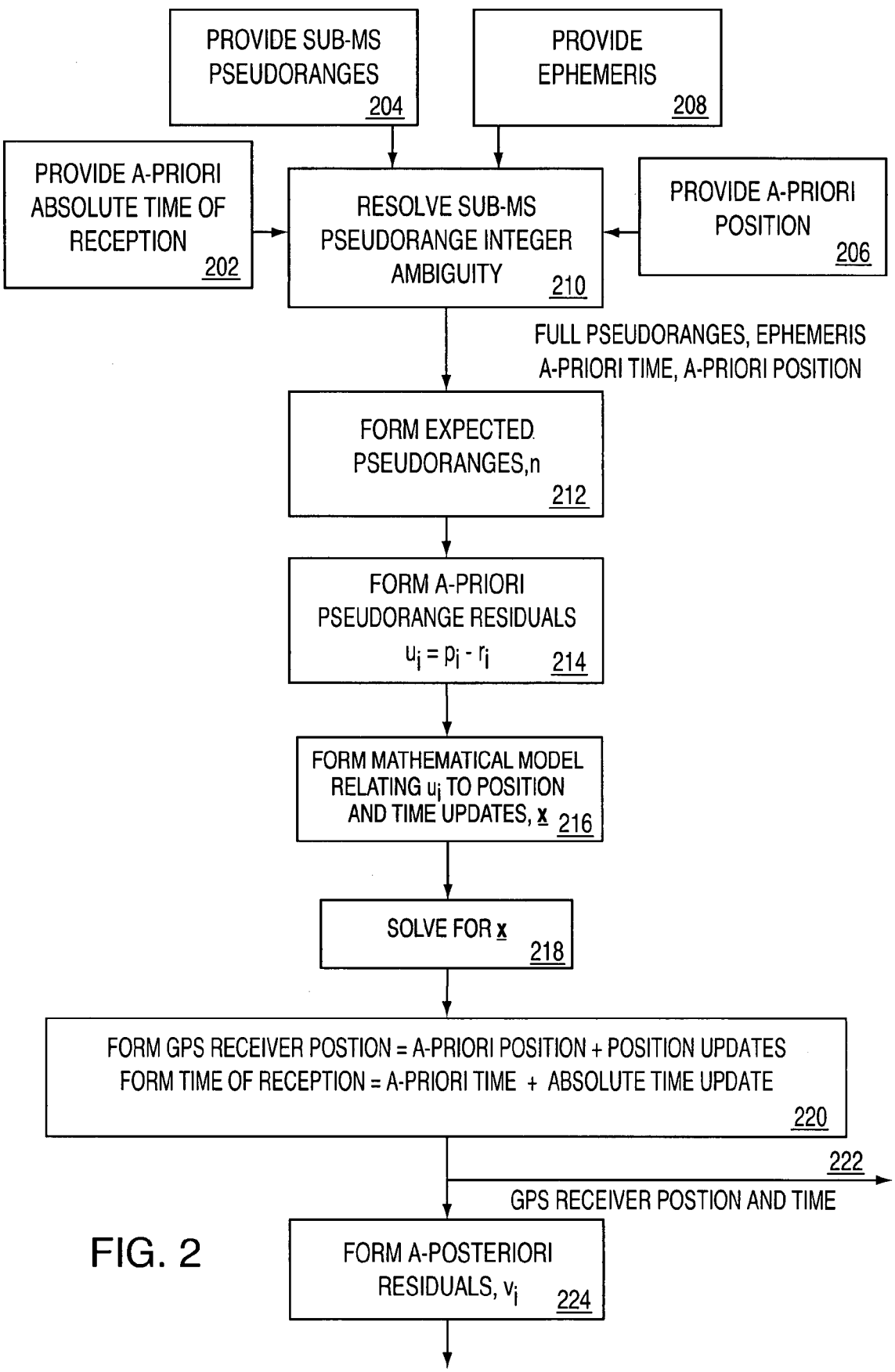
FIG. 2 depicts a flow diagram representing the operation of the apparatus of FIG. 1.

FIG. 2 is a flowchart illustration of the process 200 that is performed by the server CPU 122 of FIG. 1. At step 202, the server clock signal is used to provide an a-priori estimate of the absolute time of reception of the GPS signals at the GPS receiver. It will be understood that the use of the server clock is one embodiment used to exemplify the current invention and, in general, the a-priori estimate of time could come from a time source other than the server clock. The present invention is applicable irrespective of the source, or quality, of the a-priori estimate of absolute time. To simplify the exposition, this particular embodiment is assumed to have a server clock that provides a time tag within one minute of the actual absolute time of reception of the GPS signals at the GPS receiver. It will be understood that this simplifying assumption, while often true in practice, is not a necessary part of the invention, and has been used here only to simplify the explanation of the invention. Later in this specification, this simplifying assumption is removed.

At step 206, the tower location is provided to the CPU as an a-priori estimate of the GPS receiver position. It will be understood that the use of the tower location is just one embodiment of any number of a-priori positions that could be used (for example: a previously calculated position for the same GPS receiver 108 could be used as an a-priori position, or a combination of positions of recently used towers, or the a-priori position could simply be guessed). The present invention is applicable irrespective of the source, or quality, of that a-priori position. To simplify the exposition, this particular embodiment is assumed to have an a-priori position that is within 100 km of the true position of the GPS receiver 108. It will be understood that this simplifying assumption, while often true in practice, is not a necessary part of the invention, and has been used here only to simplify the explanation of the invention. Later in this specification this simplifying assumption is removed.

At step 204 and 208, the sub-millisecond pseudoranges and ephemeris for the appropriate satellites that are in view of GPS receiver are also provided as inputs to the process 200.

At step 210, the sub-millisecond pseudorange integers are resolved by a process described below with respect to FIG. 3. Having resolved the sub-millisecond pseudorange integers, the process creates full pseudoranges.

At step 212, the expected pseudoranges are formed. These expected pseudoranges are the pseudoranges that would be measured if all the a-priori parameters (a-priori position, a-priori absolute time of measurement, and a-priori common mode error) were in fact the actual values of these parameters. The expected pseudoranges are denoted $r_i$, the index i denotes the appropriate satellite.

At step 214, the a-priori pseudorange residuals are formed, these residuals are defined as the difference between the measured pseudoranges (denoted $\rho_i$) and the expected pseudoranges ($r_i$). The a-priori pseudorange residuals are denoted $u_i$.

At step 216 a mathematical model is formed, relating $\underline{u}$ to $\underline{x}$, where $\underline{u}$ is a vector of $u_i$ and $\underline{x}$ is a vector of the updates to the a-priori values of position, common-mode error, and absolute time of reception:

$$\underline{u} = \begin{bmatrix} u_1 \\ u_2 \\ \vdots \\ u_n \end{bmatrix},$$

where n is the number of pseudoranges. The pseudoranges are expressed in units of length (e.g. meters).

$$\underline{x} = \begin{bmatrix} x \\ y \\ z \\ t_C \\ t_S \end{bmatrix}.$$

The position updates, x, y, z, are expressed in units of length (e.g. meters) and the time updates $t_C$, $t_S$ are in units of time (e.g. seconds).

An embodiment of a mathematical model relating these two vectors is a Taylor series, where the first term in the series is the first derivative of $\underline{u}$ with respect to $\underline{x}$, the second term contains the second derivative, and so on. In one embodiment of the process, the invention uses a linearized model that keeps only the first derivative in the Taylor series. This gives the following equation relating $\underline{u}$ to $\underline{x}$:

$$\underline{u} = \begin{bmatrix} u_1 \\ \vdots \\ u_n \end{bmatrix} = \begin{bmatrix} \partial\rho_1/\partial x & \partial\rho_1/\partial y & \partial\rho_1/\partial z & \partial\rho_1/\partial t_C & \partial\rho_1/\partial t_S \\ \vdots & \vdots & \vdots & \vdots & \vdots \\ \partial\rho_n/\partial x & \partial\rho_n/\partial y & \partial\rho_n/\partial z & \partial\rho_n/\partial t_C & \partial\rho_n/\partial t_S \end{bmatrix} \begin{bmatrix} x \\ y \\ z \\ t_C \\ t_S \end{bmatrix}$$

$$= \begin{bmatrix} \partial\rho_1/\partial x & \partial\rho_1/\partial y & \partial\rho_1/\partial z & c & -\dot{\rho}_1 \\ \vdots & \vdots & \vdots & \vdots & \vdots \\ \partial\rho_n/\partial x & \partial\rho_n/\partial y & \partial\rho_n/\partial z & c & -\dot{\rho}_n \end{bmatrix} \begin{bmatrix} x \\ y \\ z \\ t_C \\ t_S \end{bmatrix}$$

$$= H\underline{x}$$

The particular values of $\partial\rho_i/\partial x$, $\partial\rho_i/\partial y$, and $\partial\rho_i/\partial z$ depend on the coordinate system used to describe the a-priori position. These terms in the first three columns of the matrix H are well known in the art, and further explanation is not required. The fourth column of the matrix is c, the speed of light, this part of the model is also standard in the art. The novel aspect of this invention requires the inclusion of the fifth column in the matrix. This fifth column exactly models the relationship between the unknown error in the a-priori estimate of absolute time, and the measured pseudoranges. Furthermore the terms in this column are the rate of change of the pseudoranges with respect to time and can be exactly calculated from the ephemeris data. Hence every term in the matrix H is known and, provided there are five or more pseudoranges available at the GPS receiver, the values of $\underline{x}$ can be calculated using linear algebra.

At step 220, the GPS receiver position is computed by adding the updates x,y,z, to the a-priori position, and the absolute time of reception is formed by adding the update $t_s$ to the a-priori time of reception. If the a-priori position and a-priori absolute time were close enough to the true position and true absolute time, then one pass through the process 200 will yield results to the required accuracy. However, if the first pass through the process 200 does not immediately converge on the required accuracy, then the result 222 is used to form a new a-priori time of reception estimate for step 202 and a new a-priori position estimate for step 206, and the process 200 is repeated until the result converges on the correct result (typically very few iterations are required because the linearization using the first order Taylor series is a very good mathematical description of the complete, non-linear, system, thanks to the fact that the satellite ranges are so much further from the earth than the error in the a-priori position).

It will be understood that the Taylor series is just one example of a mathematical model relating the unknown position and absolute time to the measured pseudoranges. The present invention is equally valid with other models, such as non-linear models, which can be solved through techniques such as iteratively fitting the unknown parameters until an acceptable solution is obtained.

If, as assumed above, the a-priori position and a-priori absolute time are within 100km and 1 minute respectively, then the result 222 will be correct. However, if the a-priori position and time are not known within these limits, then the incorrect integers may be formed at step 210 and the incorrect result 222 may be obtained. In this case the a-posteriori residuals, formed at step 224, will be used, as described below with respect to FIG. 4, to detect this errant condition and then different a-priori values will be used.

Figure 3:
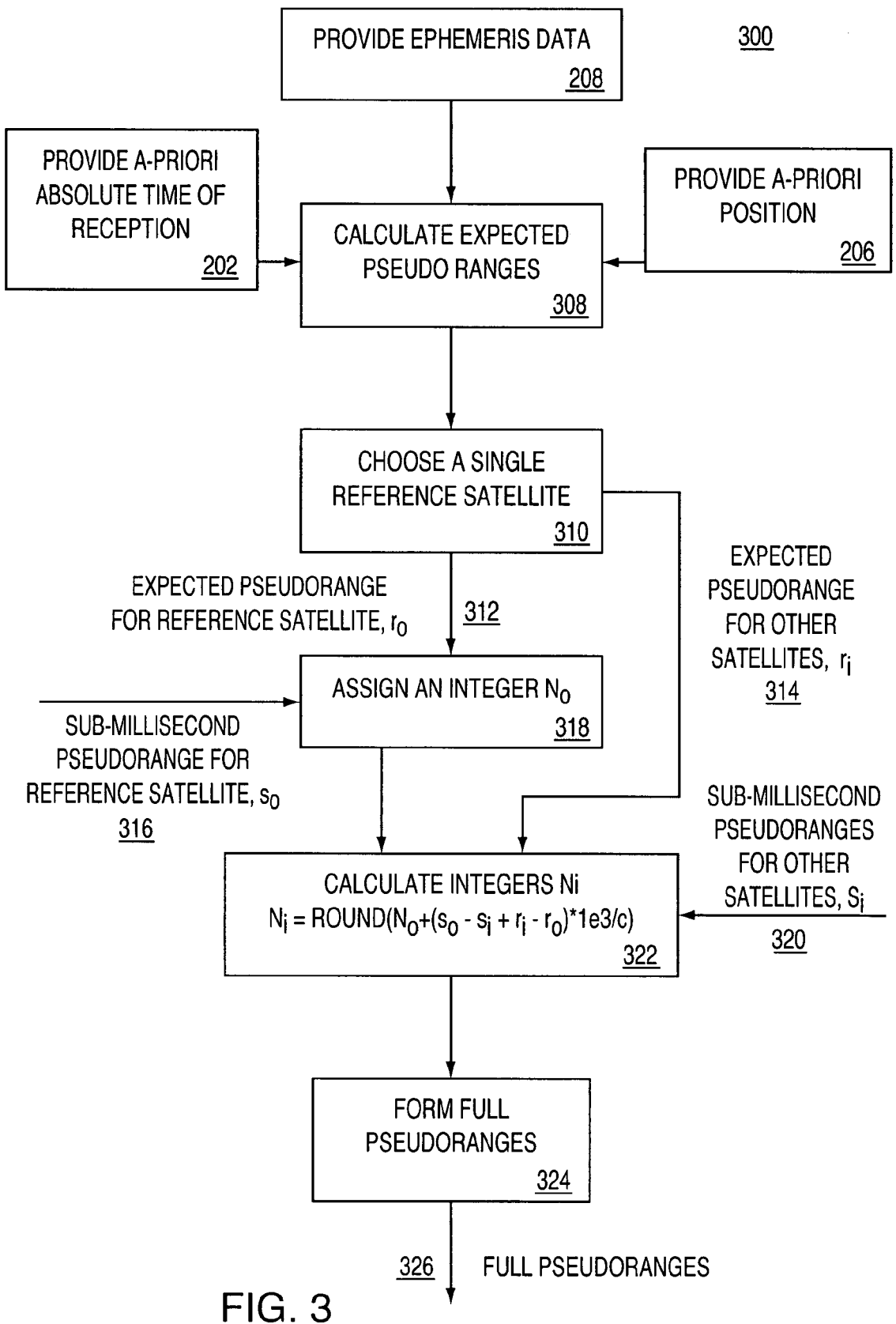
FIG. 3 depicts a flow diagram representing a method of computing pseudoranges in accordance with the invention.

FIG. 3 is a flowchart of an illustrative process 300 that resolves the sub-millisecond pseudorange integers (step 210 of FIG. 2). To simplify the exposition, this particular embodiment is assumed to have an a-priori position that is within 100 km of the true position of the GPS receiver, and an a-priori absolute time estimate that is within one minute of the true absolute time of reception at the GPS receiver. It will be understood that these simplifying assumptions, while often true in practice, are not a necessary part of the invention, and have been used here only to simplify the explanation of this embodiment of the invention. In the description relating to FIG. 4, FIG. 5, and FIG. 6, these simplifying assumptions are removed.

At step 308, the process 300 calculates the expected pseudoranges using ephemeris data (provided in step 208) for the satellites along with the a-priori absolute time of reception (provided in step 202) and the a-priori position (provided in step 206). As done throughout this specification, the term ephemeris is used to mean the satellite orbital parameters as well as the satellite clock parameters.

At step 310, a single satellite is chosen as a reference satellite. In the preferred embodiment the satellite with the highest elevation angle (from the a-priori position) is chosen as the reference, but it will be understood that it is not important which satellite is used as the reference. The expected pseudorange for the reference satellite is denoted $r_0$ (path 312). The expected pseudoranges for the other satellites are denoted $r_i$ (path 314).

At step 318, an integer is assigned to the reference satellite. The integer must satisfy the equation:

$$N_0 \cdot c/10^3 + s_0 - t_c = r_0 - e_0,$$

where c is the speed of light, expressed in m/s, $t_C$ is the common mode error, and $e_0$ is the error in the expected pseudorange introduced by the combined errors in the a-priori position and a-priori absolute time.

Those skilled in the art will understand that an arbitrary integer may be assigned, since in the following discussion it is seen that the common mode error will absorb any errors made in this integer, as long as exactly equal errors are made in all the other integers. The integer $N_0$ is assigned according to the following equation:

$$N_0 = \text{round}((r_0 - s_0) * 10^3/c).$$

At step 322, the integer millisecond values for the remaining satellites are calculated using the sub-millisecond pseudoranges 320 for all the satellites along with $N_0$. Whatever value of $N_0$ was chosen above implies an associated common mode error $t_C$. The values of $N_i$ are chosen to satisfy the following equation, which relates $N_i$, the measured sub-millisecond pseudorange ($s_i$), the expected pseudorange ($r_i$), and the common mode error ($t_C$).

$$N_i * c/10^3 + s_i - t_c = r_i - e_i,$$

where, $e_i$ is the error in the expected pseudorange introduced by the combined errors in the a-priori position and a-priori absolute time. In the preferred approach, the corresponding equation for $N_0$ is subtracted from the above equation, this exactly cancels the term $t_C$, since this term is common (by definition) for all satellites. This yields the following expression for $N_i$ $$N_i = \text{round}(N_0(s_0 - s_i + r_i - r_0) * 10^3/c).$$

The above equations represent one embodiment of a process to calculate the integers. It will be understood that any expression may be used to compute these integers, provided the relationship to $t_C$ is consistently maintained for all the integers.

In the above description the assumption was made that the a-priori position was within 100 km of the true position, and the a-priori absolute time was within 1 minute of the true time. For all GPS satellites, the maximum pseudorange rate is ±800 m/s. Thus the maximum value of the error term $e_i$ will be 100 km+60 s*0.8 km/s=148 km. This is less than half of one C/A code millisecond epoch (i.e., less than half of one integer millisecond) and the rounding operation used above will always yield the correct integers. In the disclosure with respect to FIG. 4, FIG. 5, FIG. 6, these two restrictions on a-priori position accuracy and a-priori time accuracy are removed.

If the a-priori position is not known to within 100 km, it will nonetheless be known to some finite accuracy limit. Similarly, if the a-priori absolute time is not known to within 1 minute it will be nonetheless be known to some finite accuracy limit. As described in the processes 200 and 300, any a-priori position and time estimate within the 100 km and 1 minute constraints will yield the correct integers, correct GPS receiver position, and correct absolute time. In an embodiment of the current invention, the space of all possible a-priori positions is divided into a 100 km×100 km lat-lon grid, with altitude assigned from a look-up table of topographical altitudes. Similarly the space of all possible a-priori absolute times is divided into 1-minute segments. This yields a set of all possible a-priori positions and times. The process 200 is used iteratively, with each of the possible a-priori position and time values from the set. When an a-priori position and time is found within 100 km and 1 minute of truth, then the a-posteriori residuals will be small, and the correct GPS receiver position and absolute time will be computed, as described above.

Figure 4:
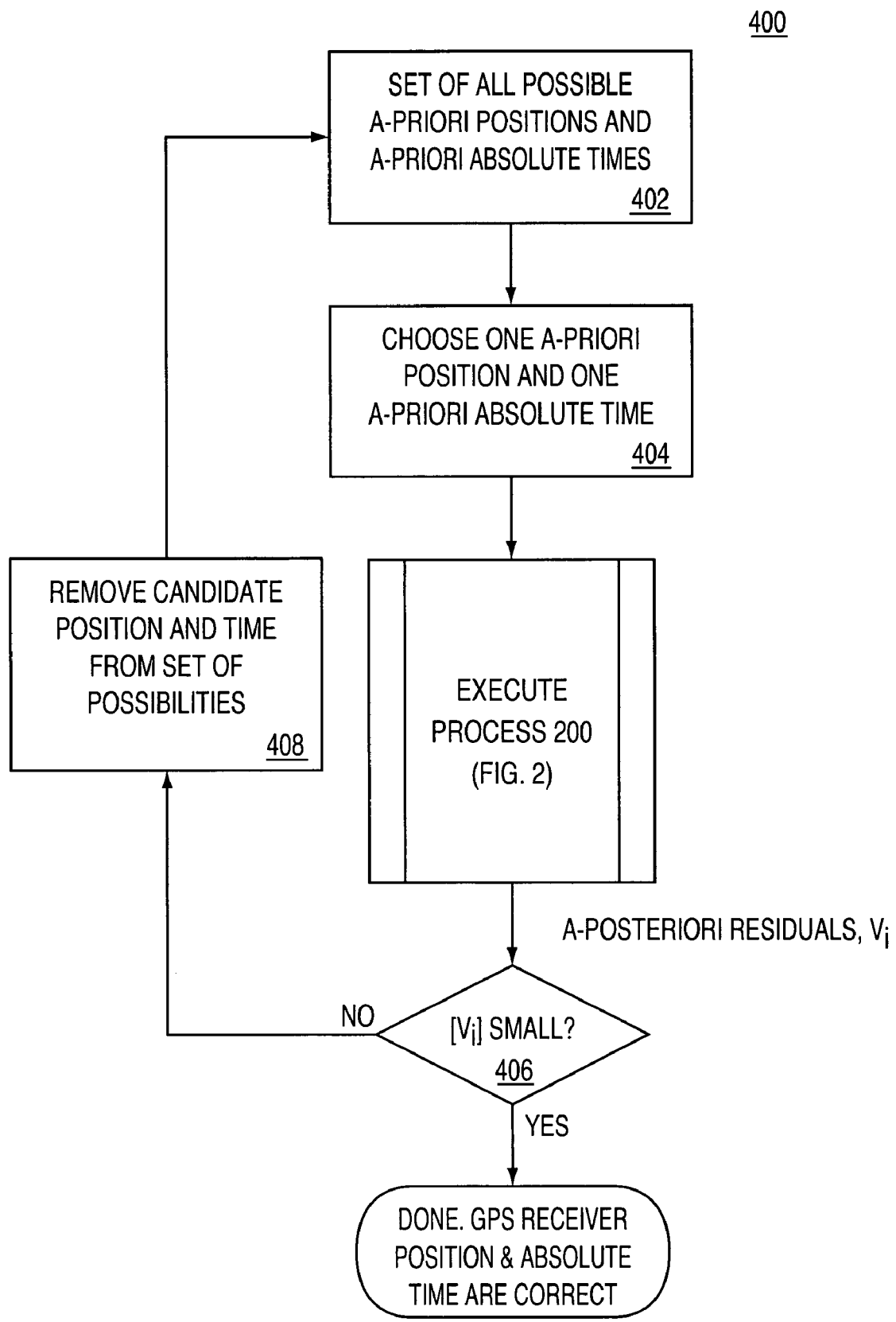
FIG. 4 depicts a flow diagram representing a method of computing receiver position and absolute time in an alternative embodiment of the invention.

An embodiment of this process 400 is shown in FIG. 4. At step 402, all possible a-priori positions and residuals are formed into a set. In one embodiment the set is organized as a 100 km×100 km grid, with altitudes assigned from a lookup table of topographical heights, and with time segmented into 1-minute segments. This is a convenient representation because, as discussed above, the combination of a 100 km grid plus the maximum pseudorange rate times 1-minute gives a maximum possible estimated error of just less than half a millisecond of range, which is necessary for the integer resolution process 300 to select the correct integers. However it will be understood that any number of different methods may be used to organize the set of all possible a-priori values, including creating new elements of the set dynamically, based on the results obtained from previously used values.

At step 404, the process 400 selects one possible a-priori position and time combination. These values are used in the process 200. At step 406, the process 400 examines the a-posteriori residuals that are produced in step 224 of FIG. 2. If the correct GPS receiver position and absolute time have been calculated, then the magnitude of the residuals will be small (that is, of the same order as the pseudorange measurement errors—tens of meters). If the a-priori position and time were far enough away from the truth that the integer ambiguities were not correctly resolved, then the residuals will be large (that is, of the order of one millisecond epoch—many kilometers). If the residuals are large then the candidate a-priori position and time are incorrect and they are removed from the set of possibilities. The process 400 is iterated until the correct position and absolute time are calculated.

It will be understood by those skilled in the art that even if the absolute time is available at the GPS receiver, the process of integer ambiguity resolution has traditionally required an initial estimate of position close enough to the true position for the integers to be uniquely defined by said initial estimate. The current invention provides a novel means of computing the correct integers without requiring an accurate initial estimate of position.

Figure 5A:
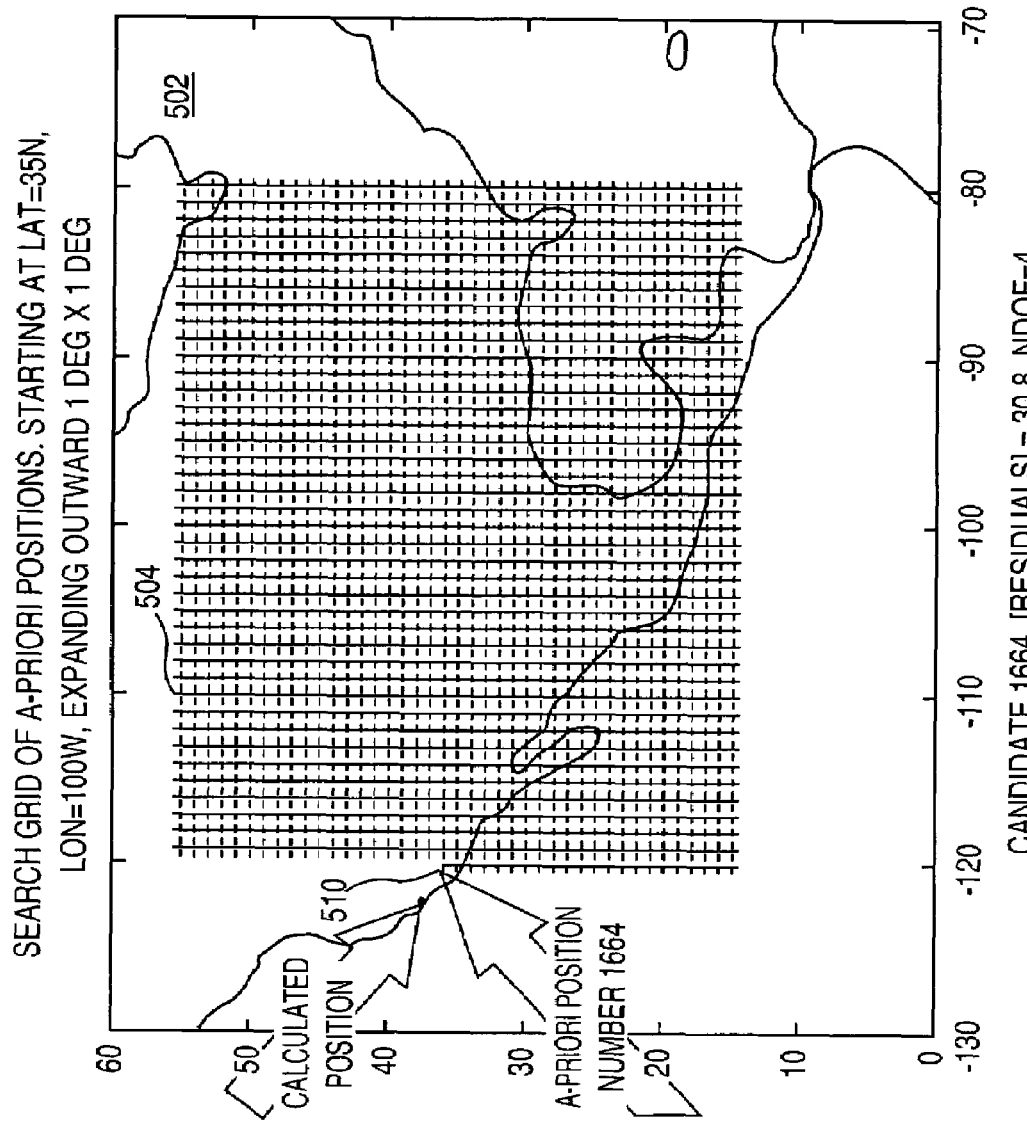
FIGS. 5A and 5B graphically depict a grid (5A) used for producing the residual magnitudes (5B) of position error.
Figure 5B:
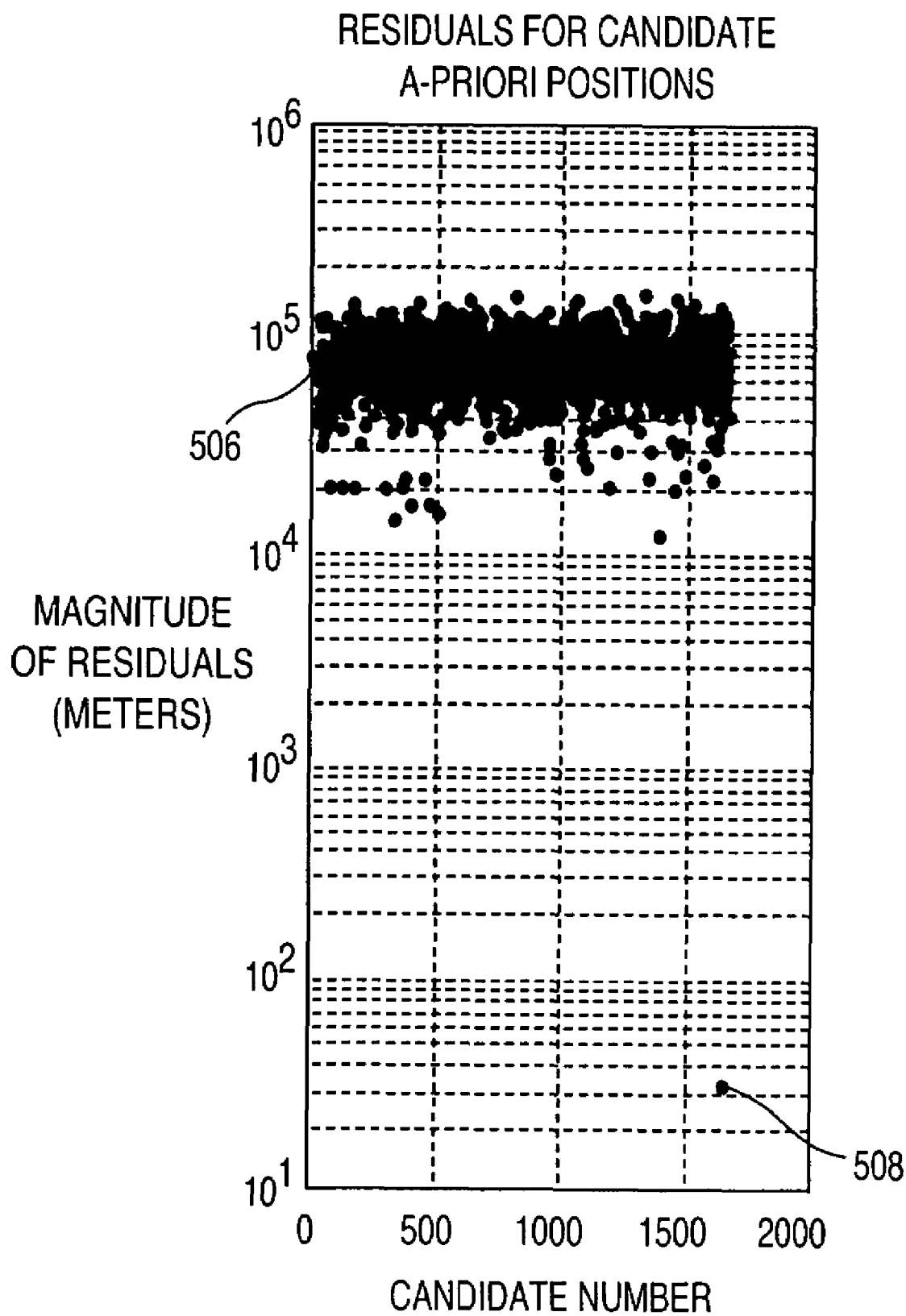

FIGS. 5A and 5B respectively depict a grid 502 used to determine receiver position in an embodiment of the invention and the residual magnitudes 506 computed during the position calculation process 200. In this example, the a-priori position is assigned as an arbitrary guess, in the middle of North America. Then the process 200 is performed for each possible a-priori position (grid point 504), and the magnitude of the a-posteriori residuals is examined. As each wrong candidate is rejected another candidate (another grid point 504) is generated by searching outwards on a 1 degree×1 degree grid 502. (Note that this 1 degree×1 degree grid is a slightly different embodiment than the 100 km×100 km grid described earlier; both embodiments are guaranteed to give at least one a-priori position that will yield the correct integers, and hence the correct position and absolute time.) The a-priori position is completed by assigning an a-priori altitude from a lookup table of topographical heights. FIG. 5A shows the 1,663 wrong candidates on a grid 504 and FIG. 5B shows the corresponding residual magnitudes 506, each one of the order of an incorrect millisecond integer (i.e., many kilometers). Once the search reaches an a-priori position in the vicinity of the true position (in San Jose, Calif.) the mathematical model causes the correct result to "snap" into place, and the correct position and time are calculated. The a-priori position candidate number 1,664 (residual magnitude 508 and grid point 510) is approximately 175 km east of the true position, which, in this example is close enough for the position and time solution to "snap" into place. The correct solution yields a residual that is approximately 30 meters, which is from one thousand to ten thousand times smaller than the incorrect residuals.

The large difference between "small" residuals (tens of meters) and "large" residuals (tens to hundreds of kilometers) makes this embodiment work very well in practice. However, it will be understood that other methods may be used to test the quality of the result, including comparing the calculated position and absolute time to a position and time obtained through some other means—such as the location of the radio tower used in a wireless-aided system. It will also be appreciated that in order to have non-zero residuals, it is necessary to have more independent observations than unknowns. In the embodiments described thus far, there have been five unknown parameters: three coordinates of position, common mode error, and absolute time. Thus at least six independent measurements are required to have non-zero residuals. If six GPS satellites can be observed, then the six measurements can be obtained from them. If there are not six satellites observable then there are several steps that can be taken, many of which are standard in the art. The number of measurements may be increased by including measurements from other sources (such as range measurements based on time-of-arrival from a wireless system, or angle-of-arrival measurements measured in a wireless system, or any other independent measurement that can be obtained).

The number of observables can also be increased by including, as "pseudo-measurements", known constraints on position, for example known or approximately known altitude can be introduced into the mathematical model as a pseudo-measurement. In the embodiment specified above, where the mathematical model is represented by the equation $\underline{u}=H\underline{x}$, a pseudo-measurement for known altitude may be created by first specifying the a-priori position in coordinates of latitude, longitude, and altitude, then by setting the a-priori altitude to the known altitude, then by adding a new line to the matrix equation:

$$\begin{bmatrix} u \\ 0 \end{bmatrix} = \begin{bmatrix} H \\ 0 & 0 & 1 & 0 & 0 \end{bmatrix} \underline{x}.$$

This approach effectively adds another measurement or observable to the mathematical model. This approach is standard in the art, and it is understood that it applies to any constraints that may be useful in solving for the unknown parameters.

Another approach is to reduce the number of unknown parameters. This may be performed by removing known, or approximately known parameters. The most commonly known parameter is altitude, and it can be removed from the mathematical model. Similarly the common mode error may be calibrated (for example, if the invention is implemented in a system with access to a stable oscillator) and removed from the mathematical model.

It will be appreciated that many combinations of the disclosed techniques may be applied to compute unknown values, including unknown absolute time.

For example, using the techniques of this invention, one can compute the time parameters alone, without computing the position. This is done, in the preferred embodiment, by fixing the position in the mathematical model to the a-priori position, and computing the remaining two unknown parameters: common mode error and absolute time.

Figure 6:
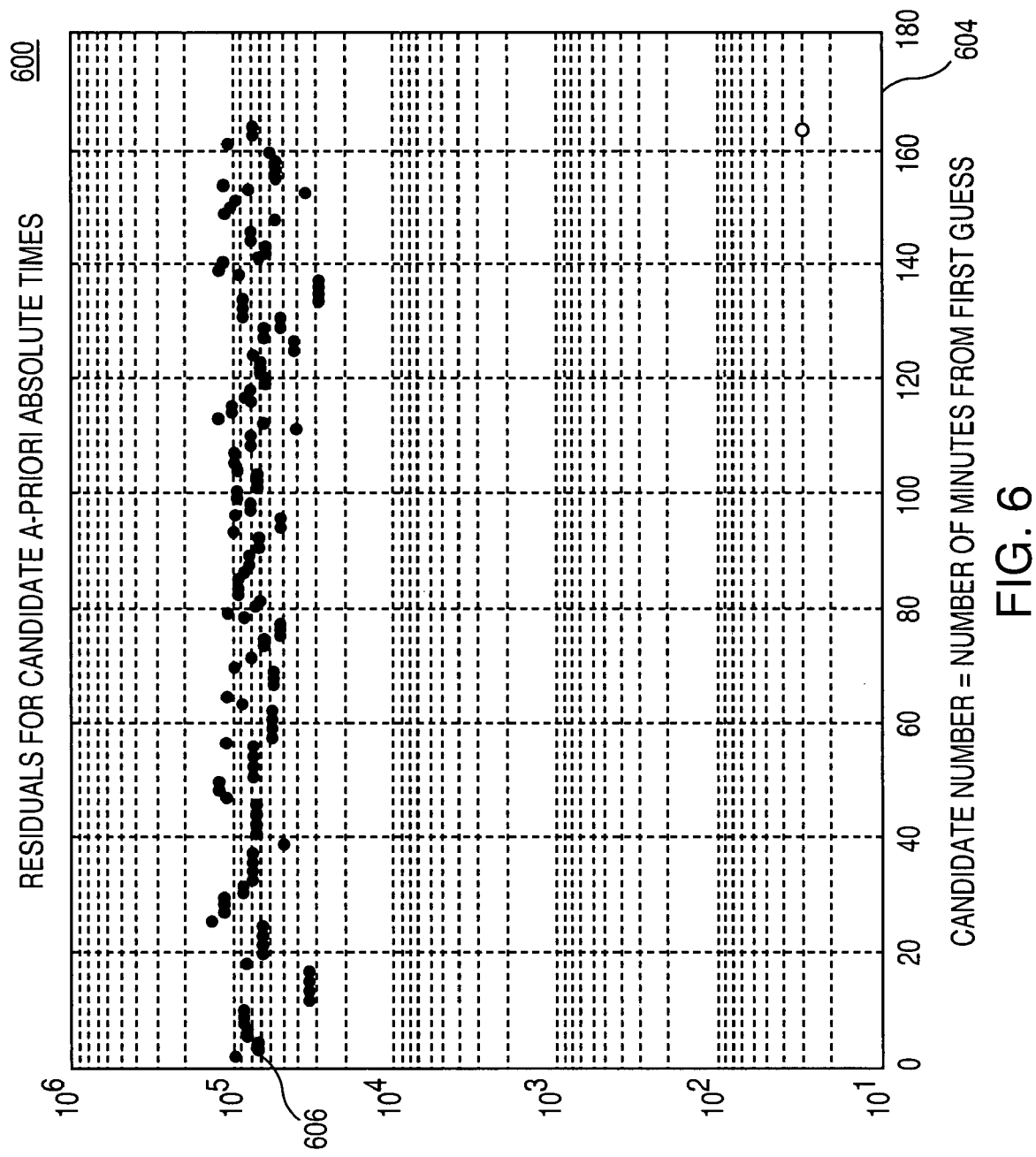
FIG. 6 depicts a graph of the residual time error used in computing an absolute time.

FIG. 6 is a graphical representation 600 of the residuals magnitudes (axis 602) associated with the different a-priori times (axis 604) that were attempted in an example embodiment of the invention. In this particular example, a range of possible times, each one-minute apart, is attempted for each of the grid points shown in FIG. 5. The first a-priori absolute time was chosen by guessing a time that turns out to be approximately two-and-a-half hours later than the true absolute time of reception. When the process 400 applies an a-priori position approximately 175 km away from the true position, and an a-priori time within one minute of the true absolute time, the mathematical model calculates the correct position and time, as shown in FIG. 5. In general, the mathematical model will calculate the correct position and time as soon as the a-priori position and time are close enough to cause process 300 to calculate the correct integers. As discussed, the preferred embodiment is guaranteed to find at least one such a-priori position and time, by creating an appropriate grid, and appropriately spaced time intervals.

In the embodiment described above, the invention has computed absolute position of a satellite signal receiver and absolute time of reception of satellite signals using pseudoranges and ephemeris. It may be desirable, however, to compute absolute position of a satellite signal receiver without ever computing absolute time of reception for the satellite signals. Thus, the present invention advantageously utilizes GPS measurements to determine receiver position without knowing or calculating precise GPS time-of-day (TOD).

To best explain the second embodiment of the invention, it is necessary to understand why precise GPS TOD is needed in prior art GPS position calculations. GPS receivers compute position by measuring their distance from several satellites, by receiving a radio signal and measuring the delay between transmission and reception of said signal. Then, using satellite orbit data and precise TOD, the satellite positions can be determined at the moment that the signal was transmitted. Finally, using the measured distance from the known satellite positions, the receiver position is computed. Thus, in a prior art GPS receiver, if precise TOD is not known, then the precise satellite positions cannot be determined. The error in the position of each satellite will result in an error in the computed receiver position. This error can be very large, even with a small imprecision in the TOD. The GPS satellites move, relative to an observer on the earth, at up to 800 meters per second. Thus an error of just one second in precise time-of-day will result in a position error of 800 meters. This is why prior art GPS receivers have required precise time-of-day.

In accordance with the second embodiment of the invention, the mathematical model formed in step 216 of FIG. 2 is transformed into an equivalent model in which the absolute time variable is eliminated. In this manner, the present invention obviates the need to determine precise TOD. More specifically, techniques for eliminating one unknown variable in a multivariable set of equations before computing the other variables are well known in the art. An embodiment of the invention employing one such technique can be understood by studying the Taylor series description of the mathematical model formed in step 216:

$$\underline{u} = \begin{bmatrix} u_1 \\ \vdots \\ u_n \end{bmatrix} = \begin{bmatrix} \partial\rho_1/\partial x & \partial\rho_1/\partial y & \partial\rho_1/\partial z & \partial\rho_1/\partial t_C & \partial\rho_1/\partial t_S \\ \vdots & \vdots & \vdots & \vdots & \vdots \\ \partial\rho_n/\partial x & \partial\rho_n/\partial y & \partial\rho_n/\partial z & \partial\rho_n/\partial t_C & \partial\rho_n/\partial t_S \end{bmatrix} \begin{bmatrix} x \\ y \\ z \\ t_C \\ t_S \end{bmatrix}$$

-continued $$= \begin{bmatrix} \partial\rho_1/\partial x & \partial\rho_1/\partial y & \partial\rho_1/\partial z & c & -\dot{\rho}_1 \\ \vdots & \vdots & \vdots & \vdots & \vdots \\ \partial\rho_n/\partial x & \partial\rho_n/\partial y & \partial\rho_n/\partial z & c & -\dot{\rho}_n \end{bmatrix} \begin{bmatrix} x \\ y \\ z \\ t_C \\ t_S \end{bmatrix}$$

$$= H\underline{x}$$

The a-priori pseudorange residuals $u_i$ can be combined to transform the matrix H into sub-matrices that decouple the unknown absolute time variable $t_S$ from the other unknowns. Specifically, for each a-priori pseudorange residual $u_i$ where i is greater than 1, a new a-priori pseudorange $v_i$ can be formed as follows:

$$v_i = u_i * \dot{\rho}_1 - u_1 * \dot{\rho}_2$$

Note that this is equivalent to pre-multiplying the equation $\underline{u} = H\underline{x}$ by the matrix:

$$\begin{bmatrix} 1 & & & \\ -\dot{\rho}_2 & \dot{\rho}_1 & & \\ \vdots & & \ddots & \\ -\dot{\rho}_n & & & \dot{\rho}_1 \end{bmatrix}$$

The above transformation results in a new set of equations:

$$\begin{bmatrix} v_1 \\ v_2 \\ \vdots \\ v_n \end{bmatrix} = \begin{bmatrix} H_{1,1} & \cdots & H_{1,4} & H_{1,5} \\ G_{2,1} & \cdots & G_{2,4} & 0 \\ \vdots & \ddots & \vdots & \vdots \\ G_{n,1} & \cdots & G_{n,4} & 0 \end{bmatrix} \begin{bmatrix} x \\ y \\ z \\ t_C \\ t_S \end{bmatrix}$$

where the variable $t_S$ has been decoupled, $H_{i,j}$ are the coefficients of the H matrix, and $G_{i,j}$ are the coefficients resulting from the above pre-multiplication. As such, the equations relating the new a-priori pseudoranges $v_2$ through $v_n$ to the unknown variables x, y, x, and $t_C$ can be separated. Provided there are five or more pseudoranges available at the GPS receiver, the values of the remaining unknown variables can be calculated using linear algebra.

There are many similar well-known methods to eliminate unknown variables from a multivariable equation. Using these techniques, the present invention can solve for any subset of the unknown position and time variables. By solving only a subset of unknown position and time variables, the present invention reduces computation complexity and allows for lack of knowledge of a particular variable, for example, absolute time.

In yet another embodiment, the invention is a method and system for computing position of a mobile device using an estimate of time received from a server. Referring to FIG. 1, in one embodiment, an estimate of time is transferred from server 121 to mobile device 102 using a time transfer protocol, such as the Network Time Protocol (NTP) or the Simple Network Time Protocol (SNTP). In another embodiment, an estimate of time provided via a one-way broadcast of time from server 121 to mobile device 102. By using an estimate of time from the server, the invention can determine the position of mobile device 102 without receiving absolute time information transmitted by a satellite or derived from a wireless network, such as a CDMA wireless network.

Figure 7:
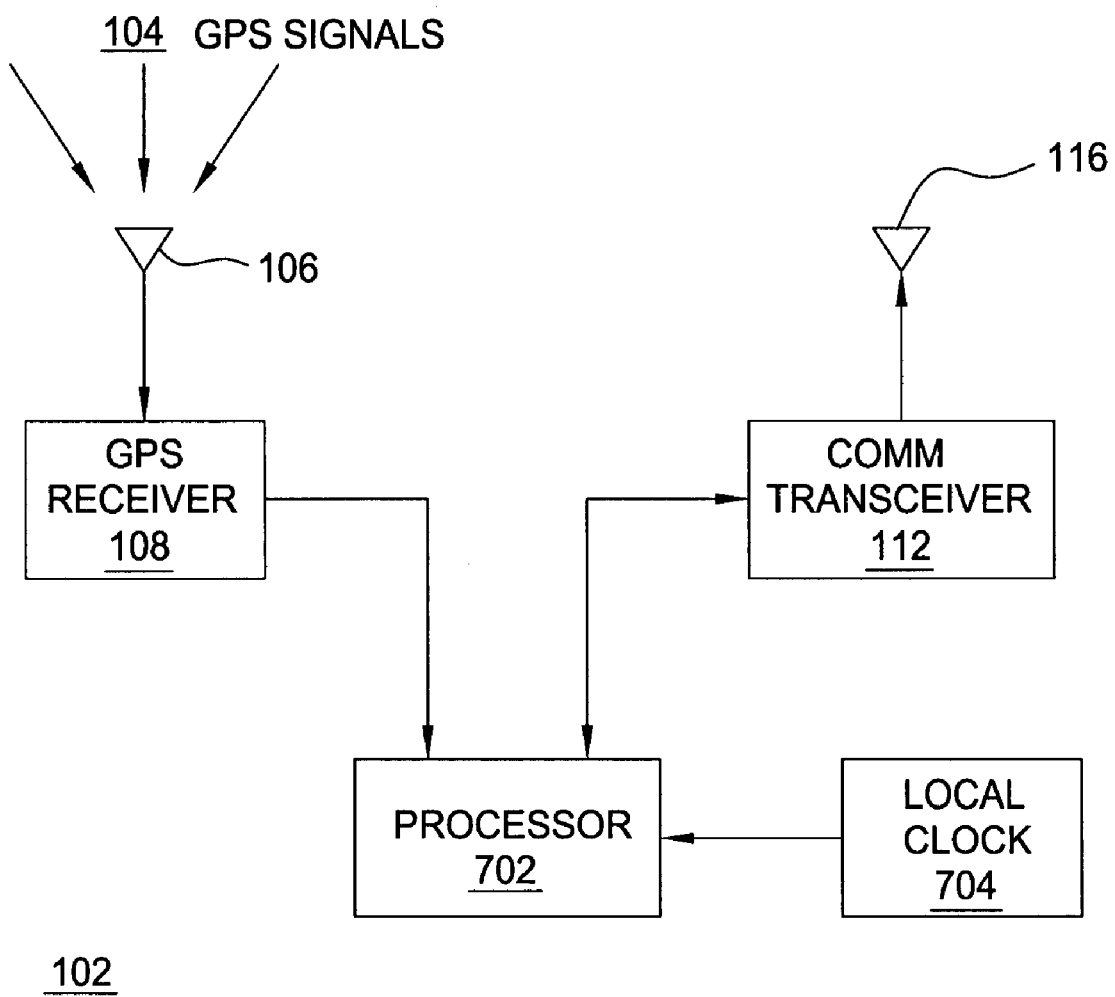
FIG. 7 depicts a more detailed block diagram of a mobile device for use with another embodiment of the invention.

FIG. 7 depicts a more detailed block diagram of mobile device 102. Elements of mobile device 102 that are the same or similar to those elements of FIG. 1 are designated with identical reference numerals and described in detail above. Mobile device 102 comprises GPS receiver 108, communications transceiver 112, a processor 702, and a local clock 704. In an embodiment, local clock 704 comprises a low power continuously operated clock (e.g., a real-time clock). A real-time clock continues to operate in a low-power state when GPS receiver 108 is inactive (e.g., powered off). In another embodiment, local clock 704 comprises a clock that operates only while the GPS receiver 108 is operating. Local clock 704 is used to provide estimated time of reception of the GPS signals. Processor 702 receives pseudoranges from GPS receiver 108 and an estimated time of reception of the GPS signals from local clock 704. Processor 702 then causes the pseudoranges and the estimate time of reception to be transmitted to server 121 via communication transceiver 112 for position computation. Alternatively, processor 702 can receive information, such as ephemeris, from server 121 in order to compute position within mobile device 102.

Mobile device 102 compensates for error in local clock 704 using an estimate of time generated by server 121. Specifically, mobile device 102 transmits a request for an estimate of time to server 121 using communication transceiver 112 and communication antenna 116. The request is communicated to server 121 via wireless communication link 150. Server 121 returns an estimate of time to mobile device 102. Mobile device 102 compensates for error in local clock 704 by adjusting the local clock 704 using the estimate of time from server 121. Alternatively, mobile device 102 compensates for error in local clock 704 by computing the error between local clock 704 and the estimate of time from server 121 and maintaining a record of the error. The record can be used to compensate for error in local clock 704 to achieve the same result as a clock adjustment.

The compensated output of local clock 704 may not be valid indefinitely. For example, local clock 704 may experience "clock drift," where output of local clock 704 varies over time. Typical real-time clock circuits operate off crystal time references with accuracies on the order of +/−20 ppm. Thus, local clock 704 could drift by this ratio, creating a one half second time error after about 7 hours of operation. For this reason, mobile device 102 compensates for error in local clock 704 by obtaining an estimate of time from server 121 periodically as needed to maintain the desired time accuracy.

Figure 8:
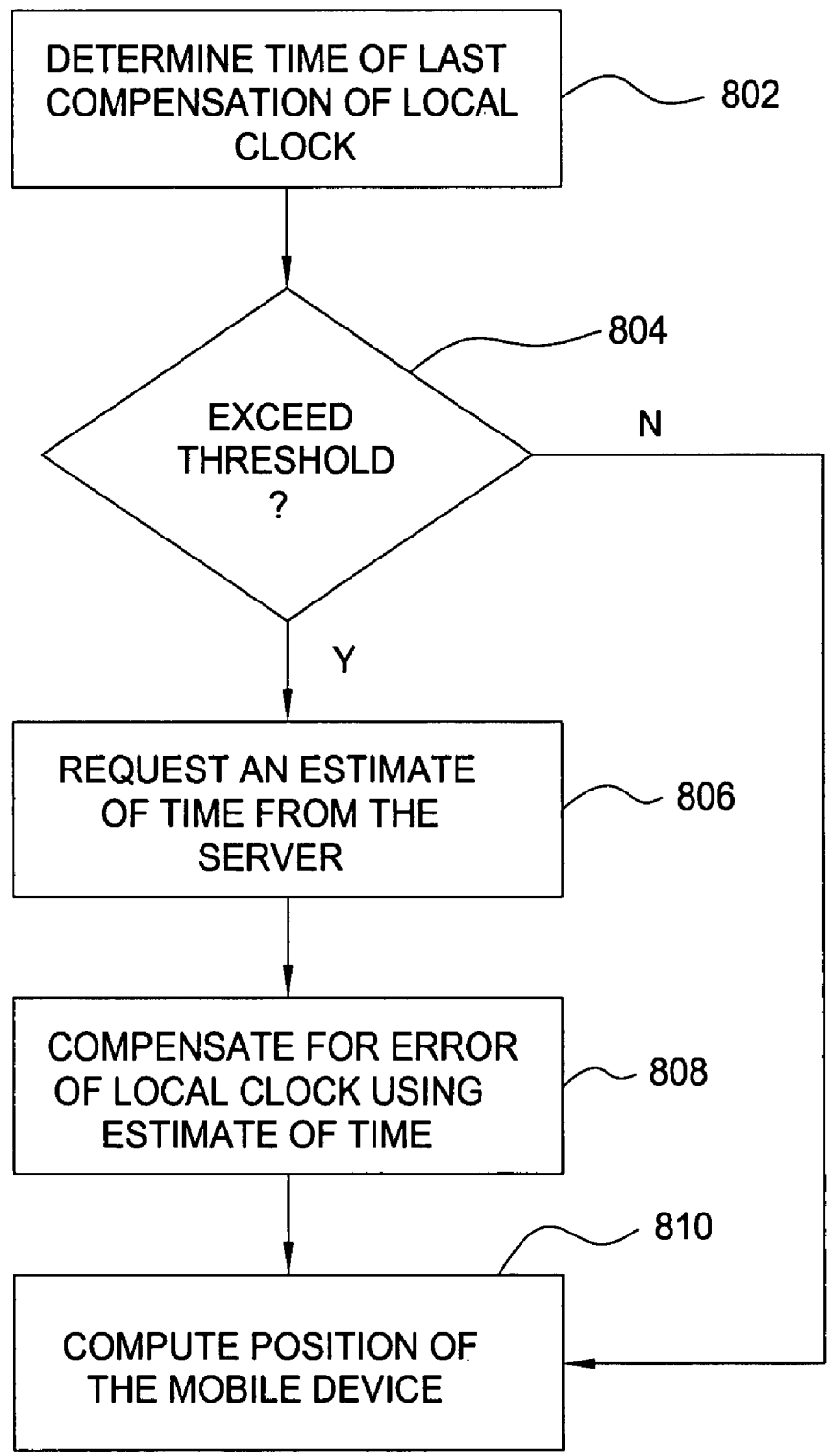
FIG. 8 depicts a flow diagram showing an exemplary embodiment of a process of compensating for error in a local clock of the mobile device in FIG. 7.

FIG. 8 depicts a flow diagram showing an exemplary embodiment of a process 800 of compensating for error in local clock 704. At step 802, the time when mobile device 102 last compensated for error in local clock 704 is determined. At step 804, the time of last compensation is compared with a threshold corresponding to the maximum desired time between local clock compensations. If the time of last compensation exceeds the desired threshold, process 800 proceeds to step 806. Otherwise, process 800 proceeds to step 810. At step 806, mobile device 102 requests an estimate of time from server 121. At step 808, mobile device 102 compensates for error in local clock 704 using a received estimate of time from server 121. At step 810, the position of mobile device 102 is computed either by server 121 or by mobile device 102, as described in detail above.

Returning to FIG. 7, in one embodiment, the compensated output of local clock 704 is used as an absolute time. The compensated output of local clock 704 is used to determine the satellite positions using the ephemeris data, thereby reducing the total number of variables in the position equation.

In another embodiment, output of the compensated local clock 704 is used as an a-priori estimate of absolute time in the various embodiments of the time-free GPS process described in detail above (i.e., processes described in FIGS. 2-6 and the various embodiments thereof). That is, a mathematical model relating the pseudoranges, ephemeris data, and the a-priori estimate of time is formed. The mathematical model is used to update the a-priori estimate of time to compute an absolute time and a position of mobile device 102. Such an embodiment is particularly advantageous in systems where the estimate of time received from server 121 is may not be accurate enough to use for determining satellite positions, for example, when the estimate of time generated by server 121 is in error by more than 10 ms.

As described above, the time-free GPS process can deal with large initial uncertainties in the a-priori time estimate. For best positioning performance, however, local clock 704 should be maintained within several seconds of absolute time. By keeping local clock 704 within several seconds of absolute time, the invention minimizes startup time, since the mobile device 102 would not have to request an estimate of time from server 121 before commencing a position fix. After the first position fix, mobile device 102 can request and receive estimates of time from server 121 as needed for positioning.

In a further embodiment, the time of last compensation of local clock 704 is compared to a threshold corresponding to a maximum allowed drift period over which the output of local clock 704 can be used as an absolute time. If the threshold is exceeded, the output of the compensated local clock 704 is used as an a-priori estimate of absolute time in the various embodiments of the time-free GPS process. If the threshold is not exceeded (e.g. a small amount of time has elapsed since the last compensation of local clock 704), then the output of local clock 704 can be taken to be more accurate and used as an absolute time instead of being used in the time-free GPS process.

In yet another embodiment, output of the compensated local clock 704 is used to check the integrity of an absolute time computed by the time-free GPS process. The time-free GPS process is used to compute absolute time as described above, and then the output of the compensated local clock 704 is used to verify the accuracy of the computed absolute time.

In yet another embodiment, the absolute time computed by the time-free GPS process is used to compensate local clock 704. Compensation of local clock 704 using absolute time computed by the time-free GPS process can be performed in addition to compensation of local clock 704 using an estimate of time from server 121. That is, compensation of local clock 704 using absolute time computed by the time-free GPS process can serve as an additional process to, or an alternative process to, the process of local clock compensation shown in steps 806-808 of FIG. 8.

Figure 9:
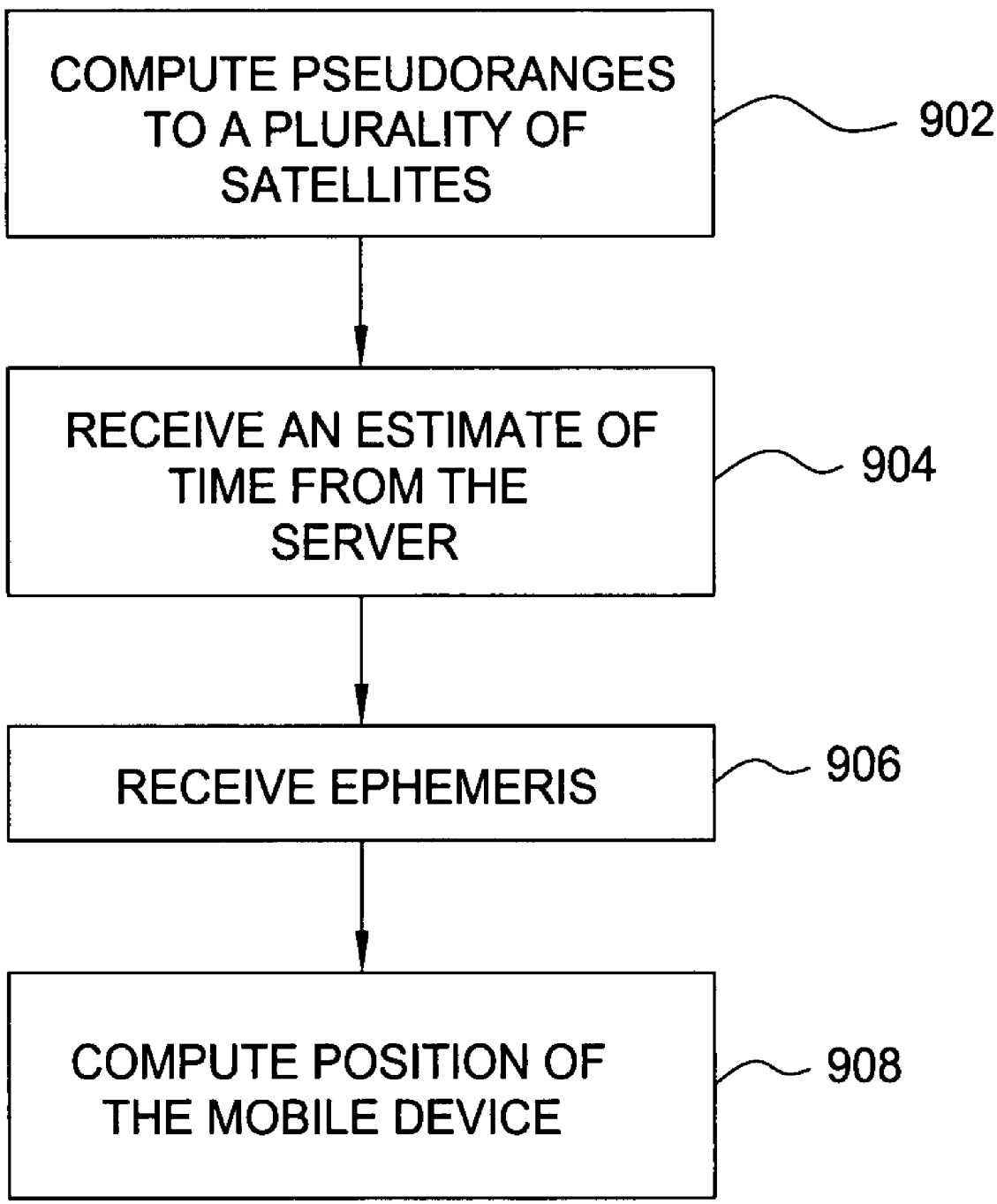
FIG. 9 depicts a flow diagram showing an embodiment of a process for receiving an estimate of time and computing position of a mobile device.

FIG. 9 depicts a flow diagram showing an embodiment of a process 900 for receiving an estimate of time and computing position of a mobile device. At step 902, pseudoranges to a plurality of satellites in a satellite constellation are computed. In one embodiment, GPS receiver 108 in mobile device 102 calculates the sub-millisecond pseudoranges. The integer portions of the pseudoranges can be determined using a-priori knowledge of approximate position of the mobile device as well-known in the art. Such a-priori knowledge of approximate position can be derived from the location of radio tower 118 with which the mobile device 102 is currently communicating. Alternatively, the integer portions of the pseudoranges are determined using the process described in FIG. 3 above.

At step 904, an estimate of time is received from server 121. In one embodiment, mobile device 102 requests and receives an estimate of time from server 121 using, for example, NTP or SNTP over wireless link 150. The request for an estimate of time can be made, for example, in response to a position request at mobile device 102, or in response to the unavailability of absolute time at mobile device 102. Alternatively, the request for an estimate of time is performed periodically. In another embodiment, mobile device 102 receives an estimate of time from server 121 on a one-way broadcast basis. In any embodiment, given the estimate of time from server 121, mobile device 102 can compensate for error in local clock 704.

More specifically, in one embodiment, mobile device 102 requests and receives an estimate of time from server 121 using a time transfer protocol (e.g., NTP or SNTP). Mobile device 102 performs a series of time requests from server 121 and updates a model of time error in mobile device 102 until the process converged. For example, the NTP protocol is defined by industry standards and can provide very accurate time setting of mobile device 102.

Alternatively, the SNTP protocol can be used when it is desirable to avoid a series of requests and responses to and from server 121, which is more time consuming and requires more communication bandwidth. The SNTP protocol is a simplification of the NTP time transfer, where the time exchange is limited to a single request of time to server 121 and a single response to mobile device 102. The SNTP protocol will generally provide less accuracy in time, since there is less data to build a reliable model of transmission delays. On the other hand, the SNTP protocol requires minimum communication and can quickly provide an estimate of time that may be adequate for purposes of the invention. The SNTP protocol need not be implemented explicitly, but can instead be buried in other protocol exchanges occurring between mobile device 102 and server 121. For example, a request for aiding data and the response thereto can contain the time packets needed to implement the time transfer protocol.

In yet another alternative, time transfer between mobile device 102 and server 121 takes place on a one-way basis. Server 121 sends an estimate of time to mobile device 102 without receiving any information or requests from mobile device 102. In this embodiment, less accuracy is achieved do to the unknown component of latency that cannot be corrected. Nonetheless, this embodiment can provide adequate accuracy for purposes of the invention. An advantage of this embodiment is that the server time information can be placed as a time stamp to any data being provided from server 121. In particular, the aiding data provided by an AGPS server can be time-stamped with an estimate of time.

Returning to FIG. 9, at step 906, ephemeris data is received regarding the satellite constellation. At step 908, the position of mobile device 102 is computed using the pseudoranges, the estimate of time from server 121 (e.g., output of compensated local clock 704), and the ephemeris data. The estimate of time from server 121 can be used as an absolute time of reception of the satellite signals. Using the absolute time of reception and the ephemeris data, the positions of the satellites can be determined. The three position unknowns and the common mode error can then be solved for using four pseudoranges. Alternatively, the altitude of mobile device 102 is estimated or determined using a terrain model, and two position unknowns and the common mode error can be solved using only three pseudoranges. Those skilled in the art will appreciate that other methods of position calculation can be implemented given various forms of a-priori knowledge of relevant variables.

Figure 10:
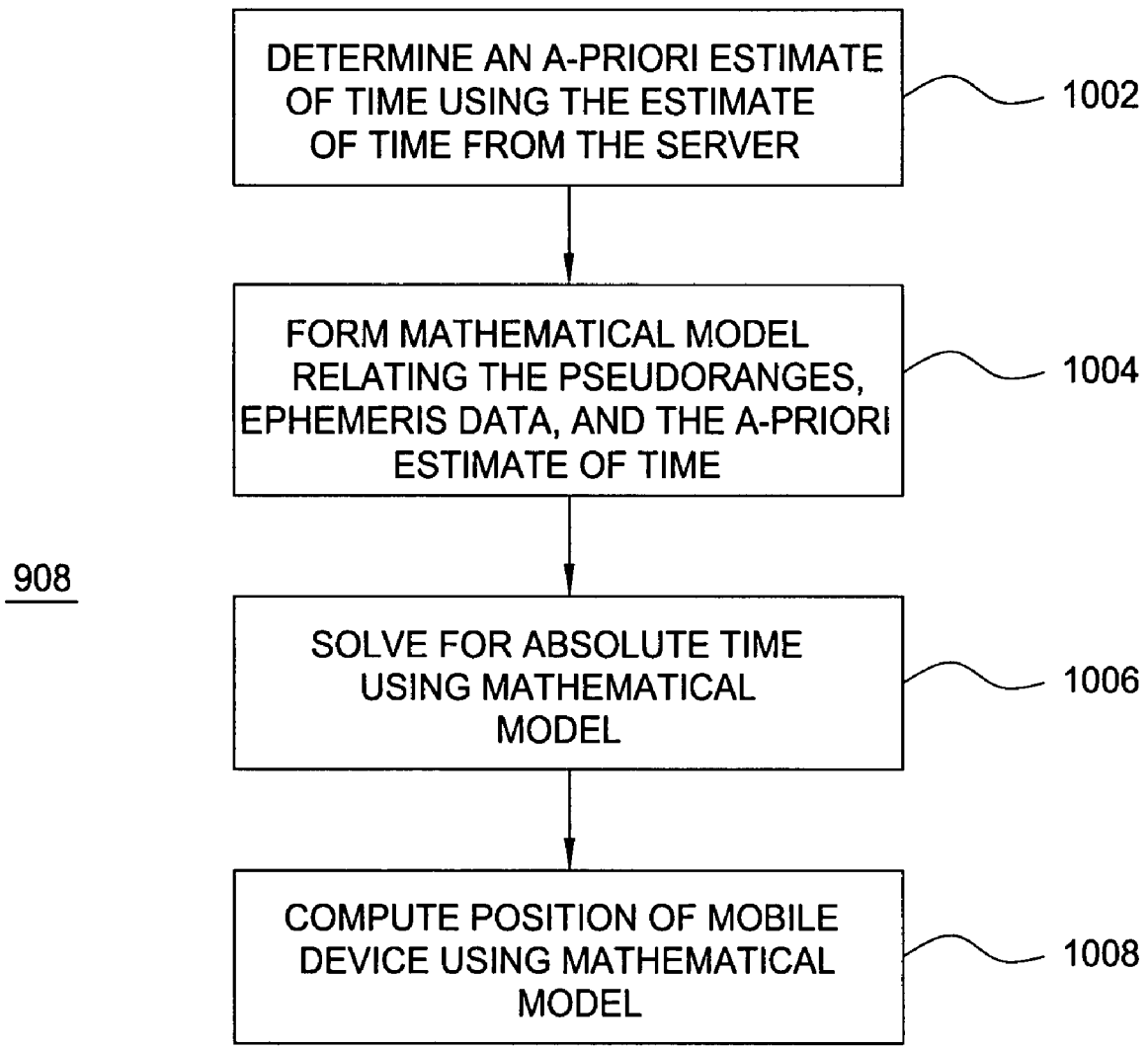
FIG. 10 depicts a flow diagram showing another embodiment of position computation in the process of FIG. 9.

FIG. 10 depicts a flow diagram showing another embodiment of position computation step 908. In this embodiment, the estimate of time from server 121 is used as an a-priori estimate of absolute time in the time-free GPS process. At step 1002, an a-priori estimate of absolute time is determined using the estimate of time from server 121 (e.g., output of compensated local clock 704). At step 1004, a mathematical model is formed relating the pseudoranges, the ephemeris data, and the a-priori estimate of time. At step 1006, an absolute time is determined using the mathematical model. At step 1008, a position of mobile device 102 is also determined using the mathematical model.

Figure 11:
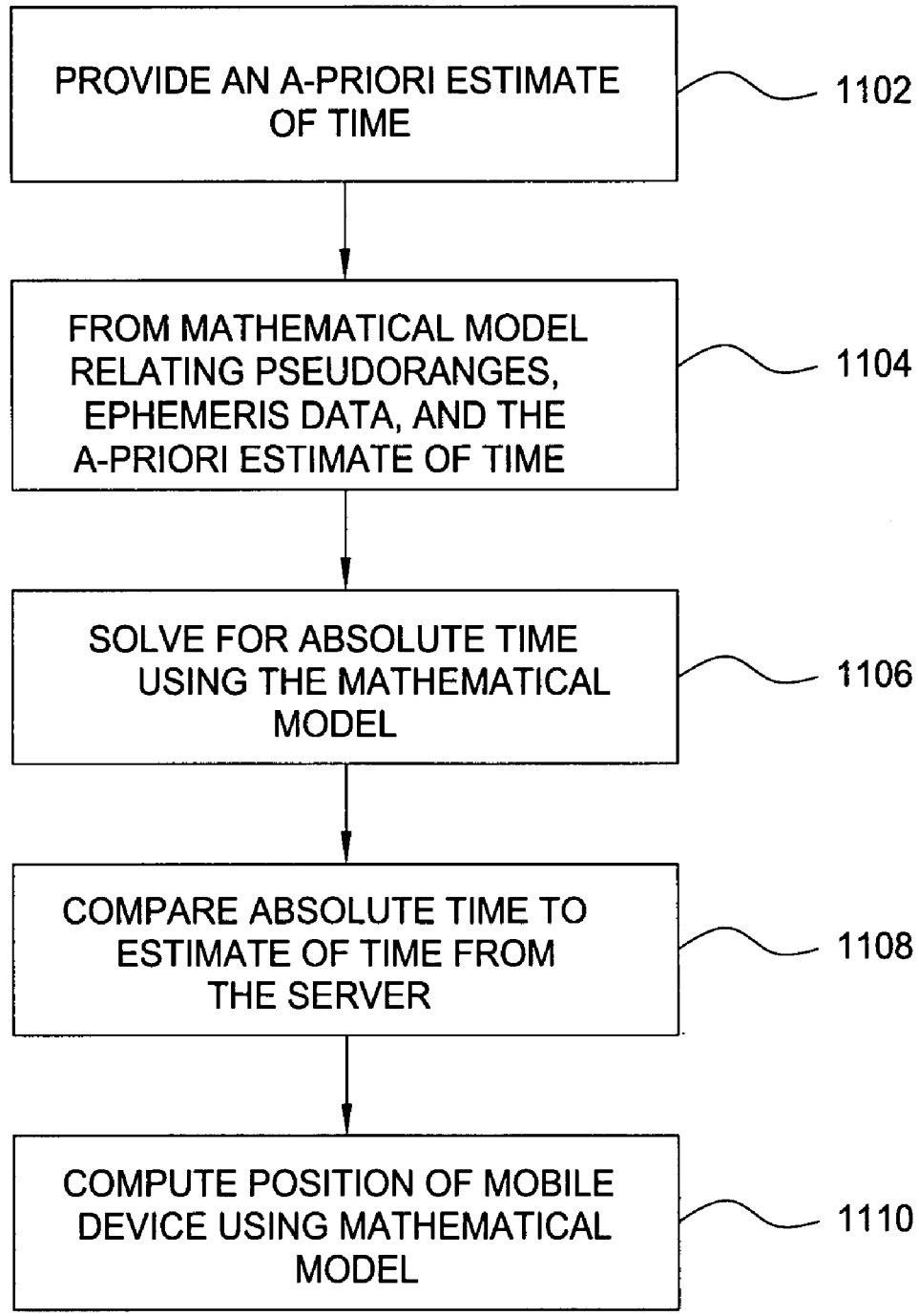
FIG. 11 depicts a flow diagram showing yet another embodiment of position computation in the process of FIG. 9.

FIG. 11 depicts a flow diagram showing yet another embodiment of the position computation step 908. In this embodiment, the estimate of time from server 121 is used to verify the integrity of an absolute time computed using the time-free GPS process. At step 1102, an a-priori estimate of absolute time is provided. The a-priori estimate of time can be derived from any time source and is applicable irrespective of the quality time source. At step 1104, a mathematical model is formed relating the pseudoranges, the ephemeris data, and the a-priori estimate of absolute time. At step 1106, an absolute time is determined using the mathematical model. At step 1108, the computed absolute time is compared with the estimate of time from server 121 (e.g., output of compensated clock 704) to verify the integrity of the computed absolute time. For example, if the estimate of time from server 121 is expected to be accurate within +/−500 ms, then the integrity of the absolute time computation can be checked by verifying that the computed value lays within this range. At step 1110, a position of mobile device 102 is determined from the mathematical model.

Figure 12:
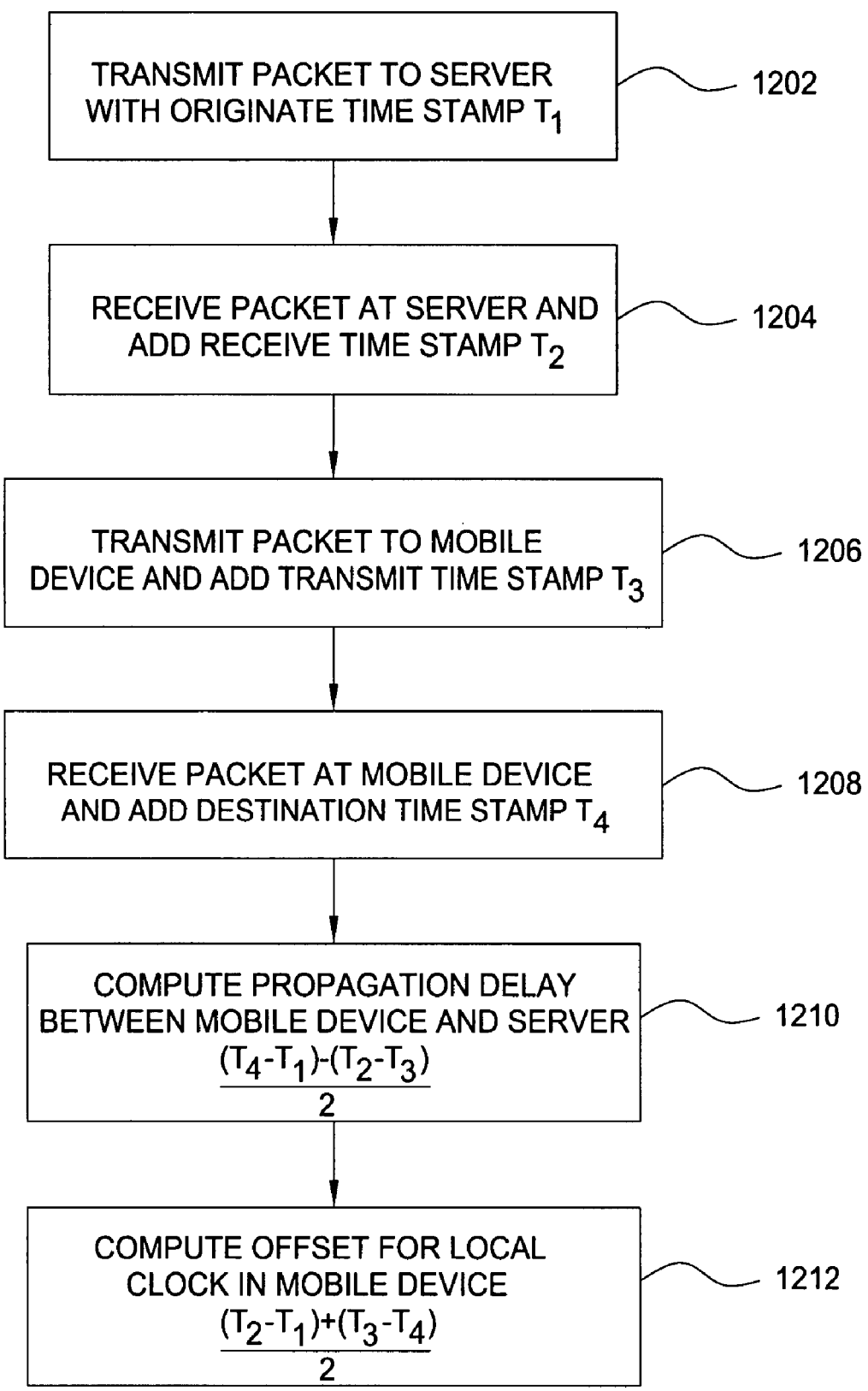
FIG. 12 depicts a flow diagram showing an embodiment of a process of time transfer between a mobile device and a server.

FIG. 12 depicts a flow diagram showing one embodiment of a process of time transfer between mobile device 102 and server 121. At step 1202, mobile device 102 transmits a data packet to server 121 with an originate time stamp $T_1$ corresponding to the time of transmission as determined by local clock 704. In one embodiment, the format of the data packet is in accordance with the NTP time transfer protocol. In another embodiment, the format of the data packet is in accordance with the SNTP time transfer protocol. A step 1204, server 121 receives the packet and adds a receive time stamp $T_2$ corresponding to the time of reception as determined by server clock 124. At step 1206, server 121 transmits the packet to mobile device 102 and adds a transmit time stamp $T_3$ corresponding to the time of transmission as determined by server clock 124. At step 1208, mobile device 102 receives the packet and adds a destination time stamp $T_4$ corresponding to the time of reception as determined by local clock 704.

At step 1210, mobile device 102 computes the propagation delay between itself and server 121. The one-way propagation delay is defined as half of the total round trip time as seen by mobile device 102 minus the time the packet spent in the server 121. That is, propagation delay is:

$$\frac{(T_2 - T_1) + (T_3 - T_4)}{2}$$

At step 1212, mobile device 102 computes the offset necessary to substantially synchronize local clock 704 with server clock 124. The offset is computed by adding the propagation delay to the transmit time stamp $T_3$ and subtracting the result from the destination time stamp $T_4$. That is, the offset is:

$$\frac{(T_4 - T_1) - (T_2 - T_3)}{2}$$

There are two important sources of time error associated with the time transfer protocol described above. The first source of error is the server knowledge of time error. That is, there is some error associated with the time provided by server clock 124 in server 121. The second source of error is the error in computed propagation delay. That is, the computation of the propagation delay assumes that the one-way delay is statistically half the round-trip delay. If this is not the case, then the propagation delay will have some error. These two error sources also depend on the communication channel employed between mobile device 102 and server 121 (e.g., GPRS or circuit switched call), and the placement of server 121 with respect to the wireless network gateway. In the invention, the range of errors can be characterized based on the aforementioned factors that contribute to error and a decision made whether the estimate of time received from server 121 is acceptable for use, for example, as an absolute time.

Although the invention has been described as using ephemeris data for obtaining satellite orbits and clock parameters, equivalent descriptions of such parameters can also be used. There are many equivalent descriptions of the satellite orbits that can be used, including descriptions of the orbits as viewed from the GPS receiver. The satellite ephemeris could be replaced by a model of the expected pseudoranges, a model of the expected geometric ranges and a clock model, or by another combination of models that describe the satellite orbits and/or clock parameters. Since all these models serve similar purposes, the term "ephemeris" as used hereinabove means satellite orbital parameters, satellite clock parameters, or like type functionally equivalent data.

Although the methods and apparatus of the invention have been described with reference to GPS satellites, it will be appreciated that the teachings are equally applicable to positioning systems which utilize pseudolites or a combination of satellites and pseudolites. Pseudolites are ground based transmitters that broadcast a PN code (similar to the GPS signal) which may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

In the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to the preferred embodiment of the present invention, other and further embodiments of the invention may be devised without departing from the basic scope thereof, and the scope thereof is determined by the claims that follow.

The invention claimed is:

1. A method of receiving an estimate of time in a satellite signal receiver comprising:
   receiving a broadcast of an estimate of time from a server at the satellite signal receiver;
   compensating for error of a clock in the satellite signal receiver using the estimate of time;
   designating the output of the compensated clock as an a-priori estimate of absolute time; and
   employing the a-priori estimate of absolute time in a mathematical model that updates the a-priori estimate of absolute time to compute a position of the satellite signal receiver and an absolute time.

2. The method of claim 1, further comprising:
   employing the absolute time when computing a position of the satellite signal receiver.

3. A method of receiving an estimate of time in a satellite signal receiver comprising:
   receiving a broadcast of an estimate of time from a server at the satellite signal receiver;
   compensating for error of a clock in the satellite signal receiver using the estimate of time;
   designating the output of the compensated clock as an a-priori estimate of absolute time;
   employing the a-priori estimate of absolute time in a mathematical model that updates the a-priori estimate of absolute time to compute a position of the satellite signal receiver and an absolute time;
   providing an a-priori estimate of absolute time from a time source;
   computing a position of the satellite signal receiver and an absolute time using a mathematical model that updates the a-priori estimate of absolute time; and
   comparing the computed absolute time with the output of the compensated clock.

4. The method of claim 3, further comprising:
   operating the clock in a low-power state while the satellite signal receiver is inactive.

5. A method of receiving an estimate of time in a satellite signal receiver comprising:
   determining a time of last compensation of the clock;
   comparing the time of last compensation with a threshold;
   requesting the estimate of time from the server in response to the time of last compensation exceeding the threshold;
   receiving a broadcast of an estimate of time from a server at the satellite signal receiver;
   compensating for error of a clock in the satellite signal receiver using the estimate of time;
   designating the output of the compensated clock as an a-priori estimate of absolute time; and
   employing the a priori estimate of absolute time in a mathematical model that updates the a-priori estimate of absolute time to compute a position of the satellite signal receiver and an absolute time.

6. The method of claim 5, wherein receiving an estimate of time from a server and compensating for error of a clock in the satellite signal receiver are performed periodically.

7. The method of claim 5, wherein requesting and receiving an estimate of time is performed in response to the unavailability of absolute time.

8. A method for determining a position of a satellite signal receiver comprising:
   computing pseudoranges that estimate the range of the satellite signal receiver to a plurality of satellites in a satellite constellation;
   requesting and receiving a broadcast of an estimate of time from a server;
   receiving ephemeris data relating to the satellite constellation;
   designating the estimate of time as an a-priori estimate of absolute time; and
   employing the designated a-priori estimate of absolute time in a mathematical model that updates the a-priori estimate of absolute time to determine the position of the satellite signal receiver and an absolute time.

9. The method of claim 8, wherein determining position comprises:
   designating the estimate of time as an absolute time; and
   employing the designated absolute time when determining the position of the satellite signal receiver.

10. A method for determining a position of a satellite signal receiver comprising:
    computing pseudoranges that estimate the range of the satellite signal receiver to a plurality of satellites in a satellite constellation;
    requesting and receiving a broadcast of an estimate of time from a server using a time transfer protocol;
    receiving ephemeris data relating to the satellite constellation;
    providing an a-priori estimate of absolute time from a time source;
    computing a position of the satellite signal receiver and an absolute time using a mathematical model that updates the a-priori estimate of absolute time; and
    comparing the computed absolute time with the estimate of time.

11. The method of claim 10, wherein the estimate of time from the server is in error by more than ten milliseconds.

12. A system for determining a position of a mobile device comprising:
    a mobile device having a satellite signal receiver and a wireless transceiver; and
    a server being in wireless communication with the mobile device, for broadcasting an estimate of time;
    wherein said satellite signal receiver compensates for error of a clock in the satellite signal receiver using the estimate of time, designates the output of the compensated clock as an a-priori estimate of absolute time, and employs the a-priori estimate of absolute time in a mathematical model that updates the a-priori estimate of absolute time to compute a position of the satellite signal receiver and an absolute time.

13. The system of claim 12, wherein the wireless transceiver transmits pseudoranges and the output of the local clock to the server; and
    wherein the server receives ephemeris data and computes a position of the mobile device using the pseudoranges, the ephemeris data, and the output of the local clock.

* * * * *